United States Patent
Wouters et al.

(10) Patent No.: US 10,538,690 B2
(45) Date of Patent: Jan. 21, 2020

(54) NON-FLOWING SILICONE ADHESIVE

(75) Inventors: Dominique Wouters, Gierle (BE); Jef Keustermans, Turnhout (BE); Peter Lenaerts, Vosselaar (BE)

(73) Assignee: AVERY DENNISON CORPORATION, Mentor, OH (US)

( * ) Notice: Subject to any disclaimer, the term of this patent is extended or adjusted under 35 U.S.C. 154(b) by 0 days.

(21) Appl. No.: 14/005,594

(22) PCT Filed: Mar. 21, 2012

(86) PCT No.: PCT/US2012/029882
§ 371 (c)(1),
(2), (4) Date: Sep. 17, 2013

(87) PCT Pub. No.: WO2012/129264
PCT Pub. Date: Sep. 27, 2012

(65) Prior Publication Data
US 2014/0017491 A1  Jan. 16, 2014

Related U.S. Application Data

(60) Provisional application No. 61/454,610, filed on Mar. 21, 2011, provisional application No. 61/485,268, filed on May 12, 2011.

(51) Int. Cl.
*C09J 183/04* (2006.01)
*C09J 7/00* (2018.01)

(52) U.S. Cl.
CPC .............. *C09J 183/04* (2013.01); *C09J 7/00* (2013.01); *Y10T 428/2878* (2015.01)

(58) Field of Classification Search
None
See application file for complete search history.

(56) References Cited

U.S. PATENT DOCUMENTS

| | | | |
|---|---|---|---|
| 3,983,298 A * | 9/1976 | Hahn et al. | 428/355 RA |
| 4,196,273 A * | 4/1980 | Imai | C08L 83/04 528/15 |
| 4,774,297 A * | 9/1988 | Murakami et al. | 525/478 |
| 5,091,483 A * | 2/1992 | Mazurek et al. | 525/477 |
| 5,351,940 A | 10/1994 | Yano et al. | |
| 5,396,972 A | 3/1995 | Grele | |
| 5,407,034 A | 4/1995 | Vydra et al. | |
| 5,480,008 A | 1/1996 | Hummel et al. | |
| 5,515,950 A | 5/1996 | Kwolek | |
| 5,535,858 A | 7/1996 | Hummel et al. | |
| 5,535,860 A | 7/1996 | Hummel et al. | |
| 5,576,110 A * | 11/1996 | Lin et al. | 428/447 |
| 5,624,763 A | 4/1997 | Melancon et al. | |
| 5,696,209 A * | 12/1997 | King | C08F 299/08 525/477 |
| 5,762,166 A | 6/1998 | Yano et al. | |
| 5,823,301 A | 10/1998 | Bildner et al. | |
| 6,121,368 A | 9/2000 | Heying et al. | |
| 6,170,620 B1 | 1/2001 | Akita et al. | |
| 6,201,055 B1 | 3/2001 | Lutz et al. | |
| 6,481,545 B1 | 11/2002 | Kunihiko et al. | |
| 6,562,180 B1 * | 5/2003 | Bohin | C08L 83/04 156/306.3 |
| 6,703,120 B1 * | 3/2004 | Ko et al. | 428/355 R |
| 7,687,591 B2 | 3/2010 | Bhagwagar et al. | |
| 2004/0222055 A1 | 11/2004 | Niwa et al. | |
| 2005/0038183 A1 * | 2/2005 | Ahn et al. | 524/861 |
| 2005/0038217 A1 * | 2/2005 | Ahn | C08K 5/10 528/15 |
| 2005/0282959 A1 * | 12/2005 | Ahn | C08K 5/10 524/861 |
| 2007/0212314 A1 * | 9/2007 | Murphy | A61F 13/02 424/66 |
| 2009/0042043 A1 * | 2/2009 | Joseph | C09D 183/04 428/447 |
| 2009/0075009 A1 * | 3/2009 | Fujisawa | C08L 83/04 428/41.8 |
| 2009/0186183 A1 * | 7/2009 | Michel | B32B 7/06 428/41.3 |
| 2009/0255766 A1 | 10/2009 | Kappagantu et al. | |

(Continued)

FOREIGN PATENT DOCUMENTS

CN  101151328 A  3/2008
JP  H05141477 A  6/1993
(Continued)

OTHER PUBLICATIONS

Donatas, Satas (Ed), "Handbook of Pressure Sensitive Adhesive Technology", 1999, Satas & Associates, 3rd edition, Chapter 1, p. 1.*
Alphonsus V Pocius Ed—Alphonsus V Pocius Ed: "Elastomeric Adhesives, Sealants, and Release Coatings Based upon Silicone Chemistry," Jan. 1, 2002, Adhesion and Adhesives Technology: An Introduction, Hanser, Germany, pp. 265-266, XP008153909, ISB: 3-446-21731-2, pp. 265-266 pp. 302-303.
International Search Report and Written Opinion dated Aug. 7, 2012, issued in corresponding International Application No. PCTUS1229882.

(Continued)

*Primary Examiner* — Anish P Desai
(74) *Attorney, Agent, or Firm* — Brian Bembenick

(57) ABSTRACT

Adhesive formulations are described that upon sufficient curing and drying, are not sticky or tacky at room temperature, yet can be heat bonded. The adhesives are particularly useful for use in bonding brake components together and find wide application in vehicle brake systems. When used in such systems, the adhesives do not flow in parking applications yet sufficiently dampen vibration in slowing or stopping applications to counter brake squeal. The adhesives can be provided in a tape form and used for bonding brake shims to brake pads in electronic parking brake systems.

28 Claims, 5 Drawing Sheets

(56) References Cited

U.S. PATENT DOCUMENTS

2010/0040842 A1    2/2010  Everaerts et al.
2010/0140029 A1    6/2010  Parild et al.

FOREIGN PATENT DOCUMENTS

JP         H07-304957    11/1995
KR    10-2007-0114303  11/2007

OTHER PUBLICATIONS

International Preliminary Report on Patentability issued in corresponding International Application No. PCTUS1229882 dated Sep. 24, 2013.

* cited by examiner

NON-FLOWING SILICONE ADHESIVE

CROSS-REFERENCE TO RELATED APPLICATIONS

The present application is a 371 of International Application No. PCT/US2012/029882, which was published in English on Sep. 27, 2012, which claims priority to U.S. Provisional Application Nos. 61/454,610 filed Mar. 21, 2011 and 61/485,268 filed May 12, 2011, both of which are incorporated herein by reference in their entireties.

FIELD

The present subject matter relates to an adhesive formulation and transfer tape including the adhesive. The transfer tape can be conveniently used to bond brake shims to brake pads or other brake system components. The subject matter also relates to methods of producing the transfer tape product and methods of using the transfer tape product.

BACKGROUND

Electronic parking brakes, also known as electrical or automatic parking brakes, are increasingly replacing mechanically operated parking brakes in motor vehicles. The use of electronic parking brake systems eliminates the parking brake lever, which is usually rather large, in the passenger compartment, thus increasing available space. Furthermore, electronic parking brake systems provide greater operating ease because the operator does not have to apply relatively high levels of force in order to apply or release the brakes. In addition, various driving situations such as pulling away on a hill or releasing the brake when first starting from parking are more easily performed electronically and/or also automatically by use of such systems.

Although providing numerous advantages, electronic parking brake systems are prone to several problems. One problem relates to flowing of adhesive used to bond brake components to one another. And, depending upon the configuration of the vehicle brake system, another problem relates to the system exhibiting excessive noise or vibration. In some vehicles, the electronic parking brake system uses the same brake components, i.e. brake pads and brake shims, as the hydraulic brake system of the vehicle. As is now common, brake shims are typically used in vehicle brake systems to reduce brake noise. Brake shims are typically thin layers of rubber or metal positioned between the brake pads and rotors. Brake shims are typically bonded or affixed to brake pads by the use of adhesives, either exclusively or in conjunction with mechanical fasteners. In order to counter excessive noise and vibration, e.g. "brake squeal," resulting from brake application such as to slow or stop the vehicle when moving, vibration absorbing pressure sensitive adhesives such as certain silicone and acrylic pressure sensitive adhesives have been used for bonding brake shims to brake pads. However, these adhesives have been found to flow, particularly during application of the brakes when parking. Flowing of silicone and acrylic adhesives occurs as a result of the high pressures applied for long time periods when a parking brake is applied. Furthermore, the tendency for an adhesive to flow is increased when the brakes are at high temperatures.

In view of these and other problems associated with currently known silicone and acrylic pressure sensitive adhesives, formulators have investigated other types of adhesives. Phenolic adhesives, which do not flow under relatively high temperature and pressure, are now typically used. A problem however with phenolic adhesives is that they do not have sufficient noise and vibration damping properties. Thus, brake systems using phenolic adhesives to bond brake shims to brake pads, typically exhibit brake squeal or emit other undesirable noises when slowing or stopping.

Accordingly, a need exists for an adhesive that exhibits sufficient bonding properties so that it can be used to bond brake shims to brake components, which does not flow in parking brake applications, and which sufficiently dampens vibration when slowing or stopping to thereby counter noise and brake squeal.

Another disadvantage associated with many adhesives currently used to bond brake shims to brake pads is that application of the adhesive requires costly equipment. Adhesive layer thickness must be controlled within relatively high tolerances. And, typically, such adhesives are difficult to handle due to their viscoelastic properties which significantly promote the sound deadening characteristics of the adhesives.

SUMMARY

The difficulties and drawbacks associated with previously known adhesives and practices are addressed by the present formulations, adhesive compositions, tape products containing such, and related methods of use.

In one aspect, the subject matter provides a silicone adhesive which comprises prior to curing at least one of a siloxane gum, a silicone resin, and a reaction adduct of a siloxane gum and a silicone resin. The adhesive also comprises a silicone hydride crosslinker. The adhesive additionally comprises a platinum based catalyst. And, the adhesive may also comprise an optional inhibitor. The adhesive exhibits a Quick-Stick value less than 5 N/25 mm and a Peel Adhesion to Stainless Steel (PASS) value at 100° C. greater than 5 N/25 mm.

In another aspect, the subject matter provides a silicone adhesive which is addition curable and which exhibits an Adhesive Bleeding Test (ABT) value greater than or equal to 5,000 kgf at 200° C.

In still another aspect, the subject matter provides a transfer tape for bonding brake components. The transfer tape comprises: (i) at least one liner; and (ii) a layer of a silicone adhesive. The silicone adhesive is selected from the group of (A) a silicone adhesive exhibiting a Quick-Stick value less than 5 N/25 mm and a Peel Adhesion to Stainless Steel (PASS) value at 100° C. greater than 5 N/25 mm, and (B) a silicone adhesive which is addition curable and which exhibits an Adhesive Bleeding Test (ABT) value greater than or equal to 5,000 kgf at 200° C.

In yet another aspect, the subject matter provides a transfer tape for bonding brake components. The tape comprises: (i) at least one liner; and (ii) a layer of a silicone pressure sensitive adhesive which is curable by addition curing, which is tacky at room temperature, and which exhibits an Adhesive Bleeding Test (ABT) value greater than or equal to 5,000 kgf at 200° C.

In another aspect, the subject matter provides a method of producing a transfer tape for bonding brake components. The method comprises preparing a silicone formulation. The silicone adhesive is selected from the group of (A) a silicone adhesive exhibiting a Quick-Stick value less than 5 N/25 mm and a Peel Adhesion to Stainless Steel (PASS) value at 100° C. greater than 5 N/25 mm, and (B) a silicone adhesive which is addition curable and which exhibits an Adhesive Bleeding Test (ABT) value greater than or equal to 5,000 kgf at 200° C. The method also comprises applying the silicone formulation to a liner or substrate layer. And, the method also comprises at least partially curing the silicone formulation to form the transfer tape.

In still another aspect, the subject matter provides a method of bonding a first member to a second member. The method comprises providing an adhesive tape including a layer of a silicone adhesive. The silicone adhesive is selected from the group of (A) a silicone adhesive exhibiting a Quick-Stick value less than 5 N/25 mm and a Peel Adhesion to Stainless Steel (PASS) value at 100° C. greater than 5 N/25 mm, and (B) a silicone adhesive which is addition curable and which exhibits an Adhesive Bleeding Test (ABT) value greater than or equal to 5,000 kgf at 200° C. The method also comprises laminating the layer of the silicone adhesive to a first member such that at least a portion of a face of the layer of the silicone adhesive is exposed. And, the method comprises bonding the first member to a second member by bonding the second member to the exposed face portion of the silicone adhesive.

As will be realized, the subject matter is capable of other and different embodiments and its several details are capable of modifications in various respects, all without departing from the subject matter. Accordingly, the drawings and description are to be regarded as illustrative and not restrictive.

DETAILED DESCRIPTION OF THE EMBODIMENTS

Figure 1:
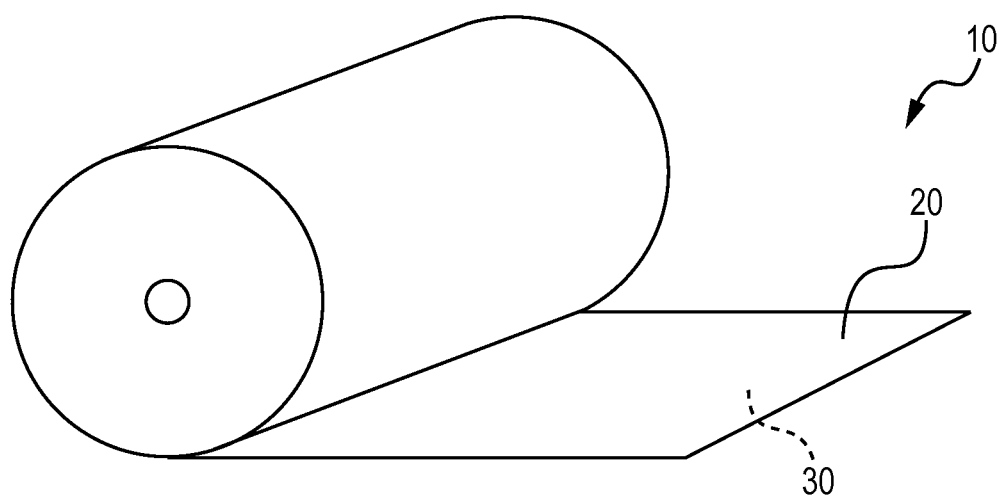
FIG. 1 is a schematic illustration of a preferred embodiment tape product in accordance with the present subject matter.

In many brake systems, the previously noted vibration absorbing layer is a viscoelastic layer. Very often the viscoelastic layer may be a viscoelastic adhesive such as an acrylic or a silicone based adhesive or the like. As previously explained, the vibration absorbing layer is provided to counter brake squeal.

As previously noted, in an electronic parking brake, another additional feature needed for a vibration absorbing adhesive is resistance to flow under pressure for a relatively long time period such as several hours or weeks, i.e. when the brake shoe is under constant pressure in the park mode. A vehicle braking system which has been braking such as after driving downhill, will typically be at relatively high temperatures. If the car is then parked and the electronic parking brake then applied, it is necessary that the adhesive also exhibit resistance to pressure for long time periods at elevated temperatures as well.

Commonly used acrylic (for example Fastape 3121 or FT 3131, available from Avery Dennison Corporation) and silicone (Fastape 2103 and FT 3102, also available from Avery Dennison Corporation) adhesives tend to flow under pressure at ambient temperatures. The tendency for such adhesives to flow under pressure at elevated temperatures is even more pronounced. Accordingly, the commonly used acrylic and silicone adhesives are not appropriate and in many cases, entirely unsuitable for use in electronic parking brake (EPB) applications. Presently, phenolic based adhesives can be used for electronic parking brake applications, but those do not exhibit sound dampening properties. Accordingly, there is a need for an adhesive which exhibits resistance to flow as the phenolic based adhesives, but which also exhibits sound dampening properties.

In accordance with the present subject matter, certain adhesives have been identified which, after drying and curing can be used in the braking systems of cars and other vehicles while withstanding high pressures and high temperatures. In most electronic parking brake systems, the adhesives must perform at temperatures up to 200° C. In describing the various preferred embodiment adhesives, reference is made to their performance in several tests. Details as to each test are provided in greater detail herein.

The present subject matter provides a silicone adhesive exhibiting an Adhesive Bleeding Test (ABT) value of at least 5,000 kgf at 200° C. In the Adhesive Bleeding Test, adhesive tape is placed between two opposing metal plates. Pressure and temperature are applied until the adhesive fails and starts to flow outside the metal plates. This test and procedure are described in greater detail herein. The present subject matter also provides a silicone adhesive exhibiting an Adhesive Bleeding Test (ABT) value of greater than or equal to 7,500 kgf at 200° C. In still other aspects and embodiments, the subject matter provides a silicone adhesive exhibiting an Adhesive Bleeding Test (ABT) value of greater than or equal to 10,000 kgf at 200° C. And, in other aspects and embodiments, the subject matter provides a silicone adhesive exhibiting an Adhesive Bleeding Test (ABT) value of greater than or equal to 15,000 kgf at 200° C.

In accordance with the subject matter, it has been found that increasing resin percentage in an adhesive formulation to counter flow or potential flow, leads to an increase in glass transition temperature ($T_g$) as measured by rheological methods, of the silicone adhesive. When measuring glass transition by rheological methods, samples are heated and placed into a controlled strain rheometer. The sample is placed between two plates, the sample thickness is about 1 mm and sample diameter is 8 mm. Using the synthetic polymer approach, the technique of small deformation dynamic oscillation is used to record changes in the dependence of viscoelastic behavior on temperature and time. The samples are then measured as they are cooled at a given rate (approximately 3° C./min). Using the method of reduced variables, composite curves are then created from empirical shifts in the data. These are used to create mechanical spectra across the Tg region. This method can be used within a temperature range of about 0° C. to 250° C. The controlled strain rheometer is operated at an angular frequency of 10 rad/second; at a percent strain of 0.1%; and a controlled normal force of 0.01N.

The present subject matter provides various unique silicone formulations for use in preparing hot bond adhesives having particular characteristics. The subject matter also provides silicone hot bond adhesives that are generally not tacky or sticky at ambient temperatures, and upon use in a brake system, do not flow in parking applications while sufficiently damping vibration to thereby counter brake squeal in slowing or stopping applications. The subject matter also provides tape products containing a layer of the silicone hot bond adhesive. And, the subject matter further provides various methods of use. These and other aspects are all described herein.

Silicone Formulations and Hot Bond Adhesives

The present subject matter provides various silicone formulations that upon sufficient curing, form hot bond adhesives that exhibit low tackiness or which are not tacky at ambient temperature. It is instructive to further describe several terms used herein. The preferred embodiment adhesives are non-tacky or not tacky at ambient temperature. The terms "non-tacky" or "not tacky" mean that the adhesives exhibit substantially no tack in dry form using finger pressure at room temperature. The preferred embodiment adhesives are also described as being hot bond adhesives. The term "hot bond" refers to a characteristic of the adhesive such that upon exposure to elevated temperatures, the adhesive becomes tacky, wets out substrate surfaces well, and after cooling to ambient temperature, adheres to a variety of dissimilar surfaces. The hot bond adhesives can be used in applications for bonding a brake shim to a brake pad. When used in such applications, the adhesives do not flow in parking applications yet also sufficiently dampen noise and vibration to thereby counter brake squeal or other desirable noises. The preferred formulations and hot bond adhesives are as follows.

The preferred embodiment adhesive comprises silicone gum and silicone resin. In practice, additional amounts of silicone resin can be added to adjust the desired properties of the adhesive. Since gum and resin can be formulated in one phase to the desired ratio or even adhesives and resins of different nature can be combined, this fraction of the adhesive can be one component or more components.

Various preferred silicone formulations that can be cured to form the preferred hot bond adhesives are set forth below in Table 1 as follows.

analogous to the Dow Corning 7682-000 component is incorporated in the Dow Corning 7657 component.

The polydimethylsiloxane gum and resin with vinyl and hydride functionality used in the preferred embodiment silicone formulations and hot bond adhesives is preferably a methyl based silicone adhesive. Such silicone adhesives are available commercially. A preferred material for the silicone adhesive, e.g. polydimethylsiloxane gum and resin with vinyl and hydride functionality, is available from Dow Corning under the designation 7657. The Dow Corning 7657 silicone adhesive is believed to be a polydimethylsiloxane gum and resin having vinyl and hydride functionality with a solids content of about 55% to 58%. It will be appreciated that the present subject matter is not limited to that particular component for use in the preferred embodiment silicone formulations and hot bond adhesives. Additional preferred materials for the silicone adhesive include, but are not limited to Dow Corning 7651, Dow Corning 7652, Dow Corning 7652(N), Dow Corning 7659, and Dow Corning 2013. The materials 7651, 7652, 7652(N), 7659 and 2013 have the same general characteristics as previously noted Dow Corning 7657. Dow Corning 2013 is a solvent free version thereof. Also it should be noted that silicone adhesives can be marketed with a broad range of gum to resin ratio and also the solids content can be varied in a broad range. Thus, the amounts noted in Table 1 are preferably with regard to the noted preferred commercially available source component. Therefore, the subject matter can utilize other components that are comparable and exhibit similar characteristics and properties. The silicone resin used in the preferred embodiment silicone formulations and hot bond adhesives preferably includes tetra(trimethysiloxy) silane, solvent, and one or more silica materials. Representative examples of suitable solvents include, but are not limited to xylene, ethylbenzene, toluene, and combinations thereof. The solvents are preferred for the processing of the embodiment but have little influence on the end product since they are eliminated in a drying process. Typically, during drying up to 99% or more of solvent(s) are removed from the adhesive formulation. A preferred example of a silica material for use in the silicone resin component is trimethylated

TABLE 1

Preferred Silicone Formulations

| Typical (parts by weight) | Preferred (parts by weight) | Most Preferred (parts by weight) | Component | Preferred Commercially Available Source |
|---|---|---|---|---|
| 100 | 100 | 100 | Polydimethylsiloxane gum and resin with vinyl and hydride functionality | Dow Corning 7657 |
| 0-60 | 0-50 | 30 | Silicone resin containing tetra(trimethysiloxy) silane, solvent, and silica | Dow Corning 2-7466 |
| 0-1.5 | 0-0.7 | 0 | Crosslinker | Dow Corning 7682-000 |
| 0.1-1.6 | 0.2-1 | 0.4 | Catalyst | Katalysator OL |

Referring to Table 1, it will be appreciated that in certain applications, the subject matter includes silicone formulations that do not utilize additional amounts of the noted silicone resin component. In such applications, siloxane gum and preferably polydimethylsiloxane gum and resin with vinyl and hydride functionality is used in combination with relatively high concentrations of crosslinker, for example from about 0.5 to about 1.6 parts by weight. Referring to Table 1, it is preferred that a silicone hydride crosslinker silica. The noted silicone resin is available commercially from Dow Corning under the designation 2-7466. The Dow Corning 2-7466 silicone resin contains (i) trimethylated silica, (ii) xylene, (iii) ethylbenzene, (iv) tetra (trimethysiloxy) silane, and (v) toluene. An alternative silicone resin is Dow Corning 2-7066 which has approximately the same general characteristics as the 2-7466 silicone resin. It will be understood that the subject matter is not limited to any of these particular commercially available components. It is contemplated that other equivalent components could be used for the noted silicone resin in the preferred embodiment silicone formulations and hot bond adhesives. For example, it is also contemplated that 2-7044 available from Dow Corning could be used instead of (entirely or partially) the previously noted 2-7466 material, also from Dow Corning.

A wide array of crosslinkers can be used in the preferred formulations. When using the noted polydimethylsiloxane gum/resin and silicone resin, a preferred crosslinker is a reactive siloxane polymer. An example of such preferred crosslinker is Dow Corning Syl-Off 7682-000. The Dow Corning Syl-Off 7682-000 crosslinker is a reactive siloxane polymer. It will be understood that the subject matter can utilize other comparable crosslinkers including for example Dow Corning Syl-Off 7678 or Momentive SS 4300C.

A wide range of catalysts can be used in the preferred formulations. Preferably, the catalyst contains an organoplatinum compound and one or more siloxane materials. A preferred catalyst is commercially available from Dow Corning under the designation 4000 catalyst or Wacker Katalysator OL. The Dow Corning 4000 catalyst contains an organoplatium compound, tetramethyldivinyldisiloxane, and dimethyl siloxane, which is dimethylvinyl-terminated. The organoplatinum compound is preferably a diethylenyl tetramethyl disiloxane platinum complex. It will be appreciated that the present subject matter can utilize other comparable catalysts, useful in catalyzing addition reactions.

The preferred formulations may also optionally comprise an inhibitor. Examples of such inhibitors include an acetylenic, maleate or other known hydrosilation catalyst inhibitors included in the composition to extend the pot-life of the composition. Such inhibitors are described in the patent literature, such as in U.S. Pat. No. 5,576,110. In many cases an inhibitor is included in commercially available silicone adhesives like Dow Corning 7657.

The preferred embodiment silicone formulations may utilize one or more silicone components in addition to, or instead of, (i) the noted polydimethylsiloxane gum and resin, and (ii) the noted silicone resin components.

Generally, the silicone formulations can be formed from either functional or non-functional silicone materials. Generally, the silicone materials may be oils, fluids, gums, elastomers, or resins, for example, friable solid resins. In some embodiments, the nonfunctionalized silicone materials can be a linear material described by the following Formula (1) illustrating a siloxane backbone with aliphatic and/or aromatic substituents:

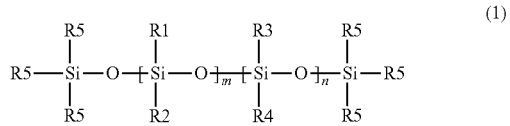

wherein R1, R2, R3, and R4 are independently selected from the group consisting of an alkyl group and an aryl group, each R5 is an alkyl group and n and m are integers, and at least one of m or n is not zero. In some embodiments, one or more of the alkyl or aryl groups may contain a halogen substituent, e.g., fluorine. For example, in some embodiments, one or more of the alkyl groups may be —CH$_2$CH$_2$C$_4$F$_9$.

In some embodiments, R5 is a methyl group, i.e., the nonfunctionalized silicone material is terminated by trimethylsiloxy groups. In some embodiments, R1 and R2 are alkyl groups and n is zero, i.e., the material is a poly(dialkylsiloxane). In some embodiments, the alkyl group is a methyl group, i.e., poly(dimethylsiloxane or "PDMS"). In some embodiments, R1 is an alkyl group, R2 is an aryl group, and n is zero, i.e., the material is a poly(alkylarylsiloxane). In some embodiments, R1 is methyl group and R2 is a phenyl group, i.e., the material is poly(methylphenylsiloxane). In some embodiments, R1 and R2 are alkyl groups and R3 and R4 are aryl groups, i.e., the material is a poly(dialkyldiarylsiloxane). In some embodiments, R1 and R2 are methyl groups, and R3 and R4 are phenyl groups, i.e., the material is poly(dimethyldiphenylsiloxane).

In some embodiments, the nonfunctionalized silicone materials may be branched. For example, one or more of the R1, R2, R3, and/or R4 groups may be a linear or branched siloxane with alkyl or aryl (including halogenated alkyl or aryl) substituents and terminal R5 groups.

As used herein, "nonfunctional groups" are either alkyl or aryl groups consisting of carbon, hydrogen, and in some embodiments, halogen (for example, fluorine) atoms. As used herein, a "nonfunctionalized silicone material" is one in which the R1, R2, R3, R4, and R5 groups are nonfunctional groups.

Generally, functional silicone systems include specific reactive groups attached to the siloxane backbone of the starting material (for example, hydrogen, hydroxyl, alkenyl, or acrylic groups). As used herein, a "functionalized silicone material" is one in which at least one of the R-groups of Formula 2 is a functional group.

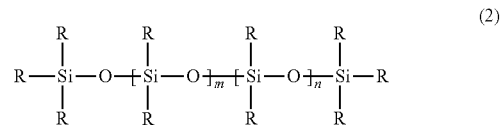

In some embodiments, a functional silicone material is one is which at least two (2) of the R-groups are functional groups. Generally, the R groups of Formula 2 may be independently selected. In some embodiments, the only functional groups present are hydroxyl groups, for example, silanol terminated polysiloxanes such as silanol terminated poly dimethyl siloxane.

In addition to functional R groups, the R groups may be nonfunctional groups, for example, alkyl or aryl groups, including halogenated (for example, fluorinated) alky and aryl groups. In some embodiments, the functionalized silicone materials may be branched. For example, one or more of the R groups may be a linear or branched siloxane with functional and/or non-functional substituents.

Generally, lower molecular weight, lower viscosity materials are referred to as fluids or oils, while higher molecular weight, higher viscosity materials are referred to as gums. However, there is no sharp distinction between these terms. Typically, the terms "fluid" and "oil" refer to materials having a dynamic viscosity at 25° C. of no greater than 1,000,000 mPa·sec (for example, less than 600,000 mPa·sec), while materials having a dynamic viscosity at 25° C. of greater than 1,000,000 mPa·sec (for example, at least 10,000,000 mPa·sec) are referred to as "gums".

The preferred embodiment hot bond adhesives may be prepared by combining silicone materials (for example, silicone gums or elastomers) with an appropriate tackifying resin, hot melt coating the resulting combination, and curing. Generally, any known additives useful in the formulation of pressure sensitive adhesives, for example, dyes, pigments, fillers, flame retardants, rheology modifiers, flow agents, surfactants, microspheres, such as, expandable microspheres, and the like may be also be included.

Generally, any known tackifying resin may be used. For example, in some embodiments, silicate tackifying resins may be used. In some exemplary adhesive compositions, a plurality of silicate tackifying resins can be used to achieve desired performance.

Suitable silicate tackifying resins include those resins composed of the following structural units M (i.e., monovalent $R'_3SiO_{1/2}$ units), D (i.e., divalent $R'_2SiO_{2/2}$ units), T (i.e., trivalent $R'SiO_{3/2}$ units), and Q (i.e., quaternary $SiO_{4/2}$ units), and combinations thereof. Typical exemplary silicate resins include MQ silicate tackifying resins, MQD silicate tackifying resins, and MQT silicate tackifying resins. These silicate tackifying resins usually have a number average molecular weight in the range of 100 to 50,000 gm/mole, e.g., 500 to 15,000 gm/mole and generally R' groups are methyl groups.

MQ silicate tackifying resins are copolymeric resins where each M unit is bonded to a Q unit, and each Q unit is bonded to at least one other Q unit. Some of the Q units are bonded to only other Q units. However, some Q units are bonded to hydroxyl radicals resulting in $HOSiO_{3/2}$ units (i.e., "$T^{OH}$" units), thereby accounting for some silicon-bonded hydroxyl content of the silicate tackifying resin.

The level of silicon bonded hydroxyl groups (i.e., silanol) on the MQ resin may be reduced to no greater than 1.5 weight percent, no greater than 1.2 weight percent, no greater than 1.0 weight percent, or no greater than 0.8 weight percent based on the weight of the silicate tackifying resin. This may be accomplished, for example, by reacting hexamethyldisilazane with the silicate tackifying resin. Such a reaction may be catalyzed, for example, with trifluoroacetic acid. Alternatively, trimethylchlorosilane or trimethylsilylacetamide may be reacted with the silicate tackifying resin, a catalyst not being necessary in this case.

MQD silicone tackifying resins are terpolymers having M, Q and D units. In some embodiments, some of the methyl R' groups of the D units can be replaced with vinyl (CH2=CH—) groups ("$D^{Vi}$" units). MQT silicate tackifying resins are terpolymers having M, Q and T units.

Suitable silicate tackifying resins are commercially available from sources such as Dow Corning (for example, DC 2-7066), and Momentive Performance Materials (such as, SR545 and SR1000).

In certain embodiments, it is preferred that the adhesive formulations be free or substantially free of any fillers or filler agents. The term "substantially free" refers to a weight proportion of less than 1%. Examples of commonly used fillers in silicone adhesives include silica. Thus, in certain embodiments, it is preferred that the silicone adhesives be free of fillers such as silica, or contain less than 1% by weight of fillers such as silica.

Generally, any known additives useful in the adhesive formulation, and chemically not containing silicones, can be used as fillers for example, dyes, pigments, fillers, flame retardants, rheology modifiers, flow agents, surfactants, microspheres, such as, expandable microspheres, and the like may also be included.

The silicone material, the tackifying resin, and any optional additives may be combined by any of a wide variety of known means prior to being cured. For example, in some embodiments, the various components may be pre-blended using common equipment such as mixers, blenders, mills, extruders, and the like. In some embodiments, the hot melt coating process is an extrusion process. In such embodiments, the various components may be added together, in various combinations or individually, through one or more separate ports of an extruder, blended (for example, melt mixed) within the extruder, and extruded to form the hot melt coated composition.

The silicone formulation is cured to form a silicone hot bond adhesive as described herein. The term "cure" as used herein generally refers to sufficiently crosslinking the components in the formulation and/or removing at least a portion of the solvents or other diluents in the formulation. Curing of the preferred adhesives can be performed by nearly any method such as for example precious metal catalyzed addition reaction using a siliconehydride crosslinker or using a radical initiator. Other methods to crosslink silicone adhesives such as actinic radiation curing, with or without photoinitiators or specific function groups on the gum and/or the resin, use of reactive groups on the gum and/or resin can also be utilized. The subject matter includes any other reaction mechanism that results in crosslinking of the adhesive. In particular, the subject matter includes systems and adhesives that can be cured by radical curing mechanisms and/or addition curing mechanisms. Typically, an addition curing adhesive comprises prior to curing: (i) at least one of a polydimethylsiloxane gum, a silicone resin, and a polydimethylsiloxane gum and a silicone resin, (ii) a platinum based catalyst, and (iv) an optional inhibitor. The adhesive includes other crosslinkers and/or catalysts. Typically, a radical (or peroxide) curing adhesive comprises prior to curing: (i) a reaction adduct of polydimethylsiloxane and/or polydiphenylsiloxane gum and silicone resin, (ii) optionally one or more silicone resins, and (iii) at least one radical generator. Preferably, the radical generator includes a peroxide crosslinker. However, the subject matter includes other types of radical generators. Also included in the subject matter are crosslinking methods which can be performed or partially performed after a tape has been made or even after the tape has been applied to brake parts using all means of delayed crosslink methods such as moisture curing, actinic radiation and heat curing at temperatures above any temperatures used in the process of adhesive tape manufacturing. In this case, the Adhesive Bleeding Test (ABT) (described in greater detail herein) test should be performed after any delayed curing occurs.

Preferably, during curing, crosslinking and removal of at least a majority of the solvents occurs so as to form a hot bond adhesive that is non-tacky at ambient temperature. Preferably, the extent of crosslinking which occurs is at least 50%, more preferably at least 60%, more preferably at least 70%, more preferably at least 80%, more preferably at least 90%, and most preferably at least 95%. The percentages are with respect to a value of 100% representing the maximum extent of crosslinking occurring. Regarding the extent of solvent removal, it is preferred that at least 80%, more preferably at least 90%, and most preferably at least 95% by weight of all solvents are removed, such as by evaporating, during curing of the formulation to produce the hot bond adhesive.

It is also contemplated that instead of forming the preferred embodiment hot bond adhesives from silicone based formulations and/or components, the adhesives could be acrylate components. Acrylic components would likely provide a cost savings as compared to silicone based formulations. The $T_g$ of most acrylates is lower than the $T_g$'s of many standard silicone adhesives.

Another technique for increasing the resistance to flow under pressure, which can be measured or quantified by the Adhesive Bleeding Testing (ABT), is by incorporating certain resins into the adhesive formulation. Non-limiting examples of such resins include silicone terpolymers having M, Q, and D units in which M represents monovalent $R'_3SiO_{1/2}$ units, D represents divalent $R'_2SiO_{2/2}$ units, and Q represents quaternary $SiO_{4/2}$ units.

In certain preferred embodiments, some of the methyl R' groups of the D units can be replaced with vinyl (CH2=CH—) groups ("$D^{Vi}$" units). MQT silicate tackifying resins are terpolymers having M, Q and T units. Suitable silicate tackifying resins are commercially available from sources such as Dow Corning (e.g., DC 2-7066), and Momentive Performance Materials (e.g., SR545 and SR1000). Silicate resins are preferred.

Other ways to increase the performance of an adhesive when subjected to the Adhesive Bleeding Test (ABT) is to increase the crosslink density of the adhesive. This can be achieved by increasing the curing temperature of the adhesive, and increasing the concentration or amount of crosslinker (such as peroxide or polysiloxanehydride) or catalyst (for example platinum).

Tape Product

The present subject matter provides a tape product that includes (i) a thin layer of a liner or substrate which is preferably a polyester material and (ii) a coating of a silicone hot bond adhesive formed by curing the previously noted formulation. Generally, a liner is a substrate with inherent release properties to an adhesive or a substrate coated with a release coating in such a manner that release properties exist. A liner can be removed from the adhesive surface with generally a release force which is easy, medium, or high. An "easy release force" as that term is used herein refers to a release force less than 20 gf/25 mm. A "medium release force" as that term is used herein refers to a release force that is between 20 to 120 gf/25 mm. A "high release force" as that term is used herein refers to a release force that is between 120 to 1000 gf/25 mm. The release force values are obtained from measurements performed at an angle of 90 degrees and at a peel speed of 300 mm/minute. After coating a sufficient amount of the formulation onto the liner, the coated liner is preferably oven dried at about 150° C. or more to cure the formulation which as previously noted, results in crosslinking and drying of the formulation. Crosslinking and/or drying of the silicone formulation is preferably performed by exposure to, e.g. heating, the formulation to a temperature of at least 60° C., more preferably at least 100° C., more preferably at least 125° C., and most preferably about 150° C. for a sufficient time period. Heating to temperatures above 150° C. can also be used. Although not wishing to be limited to any particular time periods, representative examples of suitable time periods are from about 1 minute to several hours or more, more preferably from about 20 minutes to about 120 minutes, and most preferably from about 30 minutes to about 60 minutes. Heating can be performed in nearly any manner. For example, heating can be performed by convection heating and/or heating by exposure to radiation such as microwave radiation. Combinations of these heating techniques and/or combinations of other heating techniques can be utilized. It is also contemplated that nontraditional methods of curing can be utilized such as but not limited to the use of hyper reactive formulations.

As noted, the preferred tape product comprises a liner or substrate and a layer of the silicone hot bond adhesive. The thickness of the silicone hot bond adhesive is typically from about 20 microns to about 150 microns, and preferably from about 30 microns to about 85 microns. However, it will be appreciated that the present subject matter includes tape products having adhesive layer thicknesses greater than or less than these values. The tape product can be provided in several forms such as a single release liner (double side siliconised) or using two release liners (single side siliconised).

The present subject matter tape product can utilize a wide range of liners and/or substrates. The substrate that can be selected can be any sheet or film substrate intended for use in a cutting operation. These substrates include metal foils, polymer films, paper, and combinations thereof. The substrates can be textiles including woven and nonwoven fabrics made of natural or synthetic fibers. The substrates can be single layered sheets or films or they can be multilayered constructions. These include polymeric films and multilayered polymeric films. The multilayered constructions and polymeric films have two or more layers. The layers of multilayered constructions and polymeric films can have the same composition and/or size or they can be different. The substrate can be any of the above sheet or film materials, and in addition the substrate can include a facestock or backing layer of such a material, in combination with other layers. The substrate can have any thickness that is suitable for sheet or film substrates intended for use in cutting operations, with thicknesses in the range of about 0.3 to about 20 mils, and in another embodiment about 0.3 to about 10 mils, and in another embodiment about 0.5 to about 5 mils, and in another embodiment about 0.5 to about 4 mils, and in another embodiment about 0.5 to about 3.8 mils, and in another embodiment about 0.5 to about 3.5 mils, and in another embodiment about 0.5 to about 3 mils, and in yet another embodiment about 1 to about 2.5 mils, being useful.

The metal foils include foils of such metals as copper, gold, silver, tin, chromium, zinc, nickel, platinum, palladium, iron, aluminum, steel, lead, brass, bronze, and alloys of the foregoing metals. Examples of such alloys include copper/zinc, copper/silver, copper/tin/zinc, copper/phosphorus, chromium/molybdenum, nickel/chromium, nickel/phosphorous, and the like. The metal foils can be joined or adhered to a polymeric sheet or film to form a multilayered laminate or construction. Examples of the polymer sheets and films that can be joined to these metal foils include polyimide and polyester sheets and films.

The polymer films include polyolefins (linear or branched), polyamides, polystyrenes, nylon, polyesters, polyester copolymers, polyurethanes, polysulfones, polyvinylidine chloride, styrene-maleic anhydride copolymers, styrene-acrylonitrile copolymers, ionomers based on sodium or zinc salts of ethylene methacrylic acid, polymethyl methacrylates, cellulosics, fluoroplastics, acrylic polymers and copolymers, polycarbonates, polyacrylonitriles, and ethylene-vinyl acetate copolymers. Included in this group are the acrylates such as ethylene methacrylic acid, ethylene methyl acrylate, ethylene acrylic acid and ethylene ethyl acrylate. Also, included in this group are polymers and copolymers of olefin monomers having, for example, 2 to about 12 carbon atoms, and in another embodiment 2 to about 8 carbon atoms. These include the polymers of alpha-olefins having from 2 to about 4 carbon atoms per molecule. These include polyethylene, polypropylene, poly-1-butene, and copolymers thereof. An example of such a copolymer is a copolymer of ethylene with 1-butene having from about 1 to about 10 weight percent of the 1-butene comonomer incorporated into the copolymer molecule. The polyethylenes that are useful have various densities including low, medium and high density ranges. Films prepared from blends of copolymers or blends of copolymers with homopolymers also are useful. The films may be extruded as monolayered films or multilayered films.

The paper substrates include paper, clay coated paper, glassine, paperboard from straw, bark, wood, cotton, flax, cornstalks, sugarcane, bagasse, bamboo, hemp, and similar cellulose materials prepared by such processes as the soda, sulfite or sulfate (Kraft) processes, the neutral sulfide cooking process, alkali-chlorine processes, nitric acid processes, semi-chemical processes, etc. Although paper of any basis weight can be employed, paper having basis weights in the range of from about 20 to about 150 pounds per ream (lb/ream) are useful, and papers having weights in the range of from about 30 to about 60 lb/ream can be used.

The substrate can be a polymer coated paper which is basically comprised of a sheet of paper that is coated on either one or both sides with a polymer coating. The polymer coating, which can be comprised of a high, medium, or low density polyethylene, polypropylene, polyester, and other similar polymer films, is coated onto the substrate surface to add strength and/or dimensional stability. The weight of these types of coated paper substrates can vary over a wide range with weights in the range of about 30 to about 100 lb/ream being useful. In total, the final coated paper substrate may be comprised of between about 10% and about 40% by weight polymer. For two-sided coatings, the quantity of polymer is approximately evenly divided between the top and bottom surface of the paper.

In one embodiment, the substrate is an adhesive construction wherein an adhesive layer is applied to one side of the substrate, the substrate being a facestock. Preferably, the liner material is a polyester material.

FIG. 1 is a perspective view of a preferred embodiment tape product 10 in accordance with the subject matter. The tape product 10 comprises a coating of a silicone hot bond adhesive 20 disposed on a substrate 30, which is preferably a polyester material. The tape product of the present subject matter may be provided in a roll form as depicted in FIG. 1, or may be provided in a sheet form. Other product configurations are contemplated also.

Figure 2:
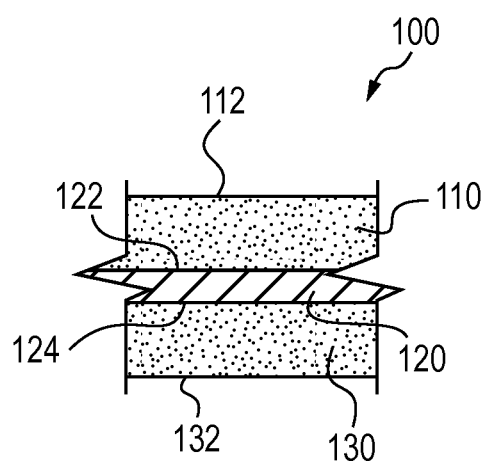
FIG. 2 is a schematic cross sectional view of one version of the preferred embodiment tape product.

FIG. 2 is a schematic cross sectional view of a preferred configuration of a tape product 100. The tape product 100 comprises a layer 120 of a liner or substrate and opposing dual layers 110, 130 of silicone hot bond adhesive. Specifically, the tape product 100 comprises a substrate layer 120 defining a first face 122 and an oppositely directed second face 124. A first layer 110 of a silicone hot bond adhesive is disposed immediately adjacent to the first face 122 of the substrate layer 120. A second layer 130 of a silicone hot bond adhesive is disposed immediately adjacent to the second face 124 of the substrate layer 120. The exposed face 112 of the adhesive layer 110 and the exposed face 132 of the adhesive layer 130 are not tacky at ambient temperature.

Figure 3:
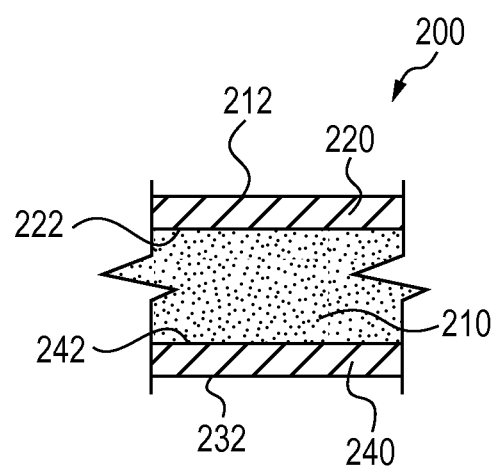
FIG. 3 is a schematic cross sectional view of another version of the preferred embodiment tape product.

FIG. 3 is a schematic cross sectional view of another preferred configuration of a tape product 200. The tape product 200 comprises a layer 210 of a silicone hot bond adhesive and opposing dual layers 220, 240 of a liner or substrate material. Specifically, a first substrate layer 220 defining an outer face 212 and an oppositely directed inner face 222, and a second substrate layer 240 defining an outer face 232 and an oppositely directed inner face 242 are provided. A layer 210 of a silicone hot bond adhesive is disposed between the layers 220 and 240, and specifically between the inner faces 222 and 242 of those layers.

Methods

Various preferred practices and techniques are associated with the subject matter as follows. Generally, a brake shim or other member is bonded to a brake pad, related assembly, or another member by (i) removing one or more liner(s) or substrate(s) from the tape product (if necessary) and (ii) placing the layer of adhesive (which was provided by the coating of the silicone formulation on the liner) between the brake pad and brake shim and heating to a temperature of approximately 50° C. above the glass transition temperature $T_g$ of the adhesive, and applying pressure. For example if the glass transition temperature $T_g$ of the adhesive is 100° C., the heating temperature is preferably 150° C. This heating temperature is periodically referred to herein as "$T_g+50°$ C." However, it will be appreciated that the preferred embodiment methods include heating to other temperatures. If no immediate bonding is required, and some dwell time on the order of a few minutes to a few days can be maintained before the next process step, the temperature can be much lower, and even be as low as room temperature.

A preferred method of use of the tape product is as follows. A brake shim manufacturer obtains the preferred embodiment tape product, which includes the silicone adhesive on the liner or substrate. The brake shim manufacturer laminates the tape on the shim material, which for example is steel or coated steel. The manufacturer then die cuts shims from the steel/tape laminate. To perform the lamination, the brake shim manufacturer typically contacts the adhesive face of the tape product to a face of a sheet of the brake shim material. Sufficient heat and pressure are then applied to the assembly. The brake shim manufacturer then supplies the die cut laminated shims to a brake system manufacturer. The brake system manufacturer removes a liner from the shim and then bonds the shim to the brake pad, using the exceptional bonding properties of the preferred silicone hot bond adhesive. The brake system manufacturer can vary the heat and pressure to optimize the bonding performance or bond as desired.

Figure 4:
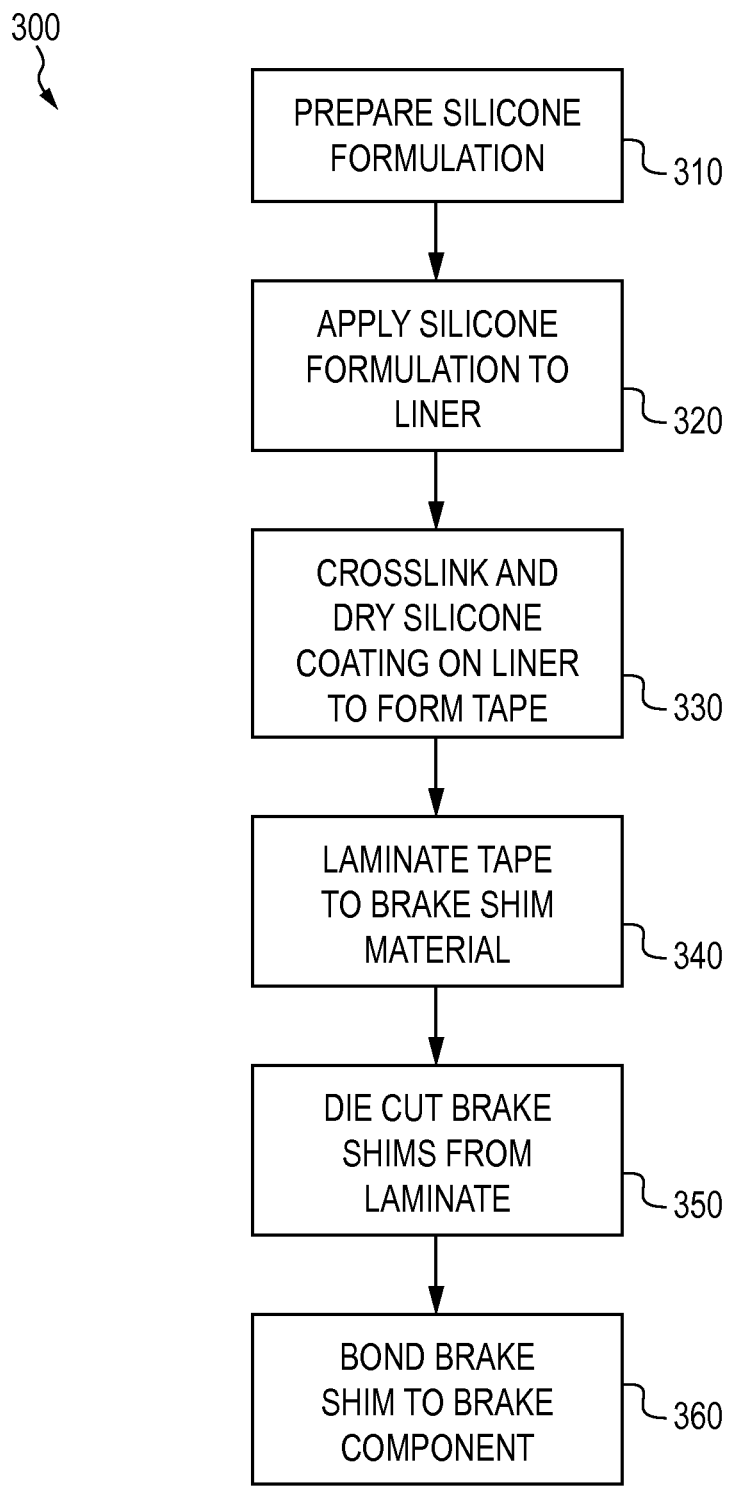
FIG. 4 is a flowchart of a preferred embodiment method of forming a preferred tape and using the preferred tape in a bonding application.

FIG. 4 schematically and collectively illustrates a preferred method 300 of preparing a preferred embodiment tape product, and a preferred method of using the tape product in a braking system. The method 300 comprises an operation of preparing a silicone formulation. This is depicted as operation 310. Generally, the components set forth in previously noted Table 1 or described herein are first obtained. The components are then combined in their noted weight proportions and appropriately mixed to form a preferred embodiment silicone formulation. It will be appreciated that the components may initially be used to prepare a premix formulation to which the crosslinker is subsequently added. Alternatively, a multicomponent premix system can be prepared using one or more other components.

The method 300 also includes an operation 320 of applying the silicone formulation to a liner or substrate. This operation is preferably performed by applying the silicone formulation which is preferably in a liquid form by conventional coating, spraying, dipping, or other known techniques to one or more faces of substrate(s) as described herein. A preferred amount of the silicone formulation is such that upon curing, the resulting silicone hot bond adhesive has a coating thickness as described herein.

The method 300 also comprises an operation 330 in which the silicone formulation is cured to thereby form the preferred embodiment hot bond adhesive. Preferably, curing is performed after forming a coating or layer of the silicone formulation. Specifically, this operation 330 involves heating the layer of silicone formulation so as to crosslink and sufficiently dry the layer. Details as to temperature, crosslinking, and extent of drying are as provided herein.

The operations 310, 320 and 330 are performed to prepare a preferred embodiment tape product in accordance with the present subject matter. The preferred tape product can be used to bond brake components as depicted in operations 340, 350, and 360 as follows.

In operation 340, the preferred tape product is laminated to a brake shim material such as steel or coated steel. Lamination may involve removal of a layer of the tape product to expose an adhesive face. After positioning a face of the silicone hot bond adhesive in contact with the steel or coated steel, heat and pressure are applied to thereby laminate the adhesive to the steel or coated steel. During lamination, the adhesive layer is heated to a temperature of at least 60° C., more preferably at least 100° C., more preferably at least 125° C., and most preferably about 150° C. for a sufficient time period. As noted, in certain embodiments, the adhesive is laminated at room temperature. Typically, lamination operations are relatively fast, such as from a few seconds to several minutes. Some formulations, although exhibiting very low to no finger tack, have been found unexpectedly to increase in bond strength over time such as for example, in a few hours.

In operation 350, the laminated steel or coated steel is subjected to one or more operations such as die cutting to thereby form brake shims or other components as desired. Cutting or other severing operations can be performed by methods well known in the art.

The brake shims can then be bonded to corresponding brake components such as brake pads by contacting the shim to the component of interest and applying heat, or heat and pressure, to thereby bond the components together. This operation is depicted in FIG. 4 as 360. Heating is typically performed such that temperatures greater than the glass transition temperature $T_g$, of the silicone formulation, are reached. Preferably, heating is performed to a temperature of approximately the $T_g+50°$ C. and applying pressure.

It will be understood that in no way is the subject matter limited to the particular operations or steps as shown in FIG. 4. Instead, the subject matter includes various alternate methods and techniques. For example, the adhesives described herein can be utilized in a tape form or applied in a wet form to one or more components in a brake system.

The present subject matter provides numerous advantages. At room temperature, any exposed adhesive faces of the preferred embodiment tape products are not sticky or tacky. And so the tape product can be easily handled and stored. In other embodiments, the tape products may be tacky or sticky.

Another advantage of the subject matter is that since the adhesive is not sticky or tacky at room temperature, inexpensive liners can be used in the tape product.

Another advantage of the present subject matter tape product, is that after bonding of brake components, the adhesive does not flow. As previously noted, flowing of adhesive in parking brake applications is a common problem when using conventional silicone and acrylic pressure sensitive adhesives. Phenolic adhesives, which do not flow under relatively high temperature and pressure, are therefore used. The problem however with phenolic adhesives is that they do not exhibit constrained layer_damping properties. Flowing of silicone and acrylic adhesives occurs as a result of the high pressures applied for long time periods when a parking brake is applied. The tendency for an adhesive to flow is increased when the brakes are at high temperatures. The adhesive in the preferred embodiment tape does not flow even at temperatures as high as 200° C. It is believed that the flow resistance of the preferred embodiment adhesives is comparable to that of a phenolic adhesive up to about 225° C. The potential for flow of the adhesive in the present subject matter tape product can be adjusted by controlling the ratio of adhesive and resin in the silicone formulation.

Another advantage of the subject matter is that use of the preferred adhesives formed from the noted silicone formulations results in sound dampening in the parking brake assembly. This property tends to counter brake squeal and other undesirable noises from being emitted by a braking system.

EXAMPLES

Materials Used in the Examples

DC 7657 is a silicone adhesive available from Dow Corning.

DC 2013 is a silicone adhesive available from Dow Corning.

PSA 610 is silicone adhesive available from Momentive.

DC 2-7466 is a silicone resin available from Dow Corning.

SR 545 is a silicate tackifying resin available from Momentive.

Syl-Off 7682-000 is a silicone hydride crosslinker from Dow Corning.

Katalysator OL is a Pt-catalyst available from Wacker Chemical.

Peroxan is a radical initiator available from Pergan Company.

FT 3121 is an acrylic adhesive tape and available from Avery Dennison.

FT 2103 is a silicone adhesive tape and available from Avery Dennison.

DC 7651N is a silicone adhesive available from Dow Corning.

Syl-Off Q2-7785 fluorosilicone release coating, Syl-Off Q2-7560 crosslinker is a fluorosilicone release system from Dow Corning.

Test Methods

Test Method: Adhesive Bleeding Test (ABT)

Successful application of an adhesive in a brake application as described herein requires no flow or substantially no flow of the adhesive at high temperature and pressure. To simulate such conditions in a brake system, an Adhesive Bleeding Test (ABT) was utilized. In this test, a layer of adhesive was positioned between metal sheets and placed under pressure in a hydraulic press. The adhesive was heated by a hot oil circuit. An adhesive dry coat weight of 80 to 88 g/m² (target 84 g/m²) was used unless otherwise noted. The ABT test adhesive coat weights of 80 to 88 g/m² are equivalent to 77 to 85 microns in thickness. Thinner coatings will in general yield comparable or higher ABT values.

Figure 7:
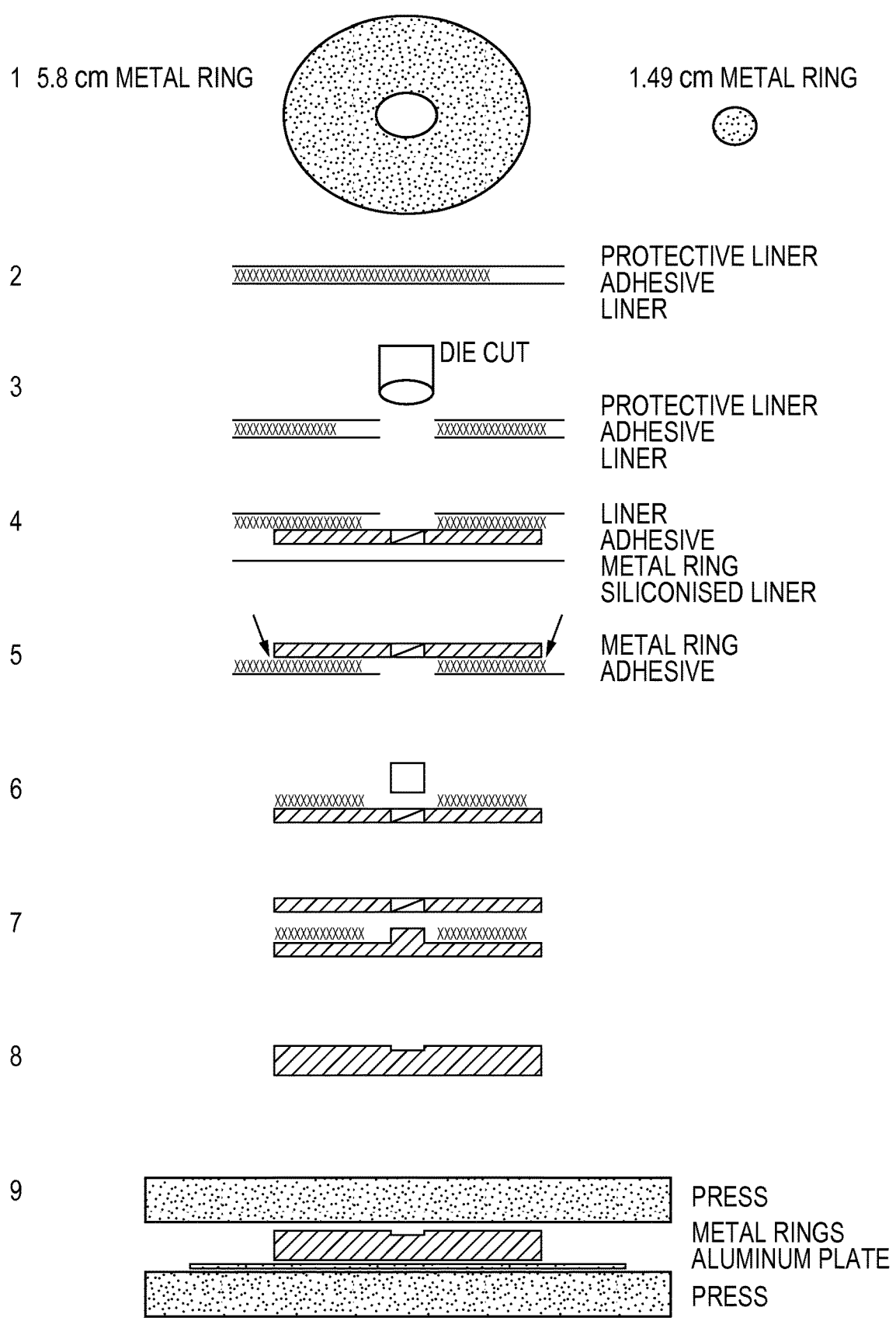
FIG. 7 illustrates preparation of samples and testing for an Adhesive Bleeding Test (ABT) described herein.

FIG. 7 schematically illustrates test sample preparation and set up for the Adhesive Bleeding Test (ABT). The following testing assemblies were used. Circular metal sheets made of CK45 steel (SAE 1045, DIN 1.1191) having a thickness of 2.8 mm were obtained. The deviation in thickness of each sheet was less than 10 microns, and usually less than 5 microns. Each sheet had an inner circular opening of 1.50 cm+/−0.02 cm in diameter and an outer diameter of 5.8 cm+/−0.02 cm. Another circular metal sheet was also provided having a thickness of 4.9 mm and a diameter of 1.49 cm+/−0.02 cm. This is shown as operation 1 in FIG. 7. In forming the stacked assemblies, the smaller circular sheet was positioned in the middle hole of two of the previously described 5.8 cm diameter sheets. The smaller 1.49 cm diameter sheets serve to prevent the stacked assembly from shearing apart when under pressure. This is shown as operation 2 in FIG. 7. A double linered adhesive tape to be tested was die cut with a 18 mm circular die and the tape cut to an outer diameter greater than 6 cm, usually 7 cm concentric with the 18 mm hole. This is shown as operation 3 in FIG. 7. The first liner was removed from the tape and the tape was then placed on a face of one of the 5.8 cm diameter metal sheets so that the inner circular openings of the tape and the metal sheet were aligned with one another. This means that the 18 cm circular die cut is centered exactly in the middle of the sheet. If this is not centered in the middle the bleeding of the adhesive towards the middle of the sheet will not be uniform. This is shown as operation 4 in FIG. 7. This results in a ring of exposed metal between the inner circular edge of the tape (defining the 18 mm hole in the tape) and the inner circular edge of the metal sheet. The width of the exposed metal ring was about 1.5 mm. Finger pressure was used to adhere the tape to the metal sheet, which was heated to 40° C. This is shown as operation 5 in FIG. 7. In cases when the adhesive was not a good pressure sensitive adhesive at room temperature and the 40° C. treatment was insufficient to adhere the tape to the metal sheet, the metal sheet was heated for 4 minutes in a preheated oven of 100° C. Immediately after the oven treatment, wearing gloves, the tape was adhered firmly to the metal sheet using finger pressure and the laminated assembly then allowed to cool to room temperature.

This practice resulted in enough adhesion between the tape and the first metal sheet to perform the next step. Using a sharp cutter or knife, the excess tape along the outer peripheral edge of the tape sample was removed by moving the knife around the perimeter of the circular metal sheet to which the tape was adhered. This is shown as operation 6 in FIG. 7. The removal of the excess tape should be done very precisely, because the amount of adhesive which may flow out from the sheet when applying pressure and temperature will be carefully measured during the test and so remaining adhesive/liner during this cutting procedure may influence the test result. So the edge of the sheet must be made as clean as possible. Then, the second liner was removed from the tape and the 1.49 cm diameter metal sheet was placed in the openings of the tape and the underlying 5.8 cm diameter metal sheet. The second 5.8 cm diameter metal sheet was placed on top and adhered to the newly exposed side of the adhesive tape and the assembly was placed back in a 40° C. oven. This is shown as operation 7 in FIG. 7. Finger pressure was used to adhere the second metal sheet in a symmetrical fashion. Samples showing little adhesion at room temperature were placed in a preheated oven at 100° C. for 4 minutes. Immediately after the oven treatment, wearing gloves, the tape was adhered firmly to the metal sheet using finger pressure and the laminated assembly then allowed to cool to room temperature. The oven step could be omitted for samples using a pressure sensitive adhesive at room temperature. The laminated assembly resulting from this operation, designated as operation 8, is shown in FIG. 8.

The hydraulic press used was from Fontune-Grotnes, Vlaardingen, Netherlands, type SRA100 with platen dimensions of 225 mm×320 mm. A more recent version of the same instrument is also known as THA200 with platen dimensions of 225 mm×225 mm. The temperature of the press can be set between 25° C. and 300° C. in increments of 2° C. Calibration of the instrument using a thermocouple showed the temperature precision was less than 2° C. The force of the press can be set between 500 kgf and 20,000 kgf in increments of 500 kgf. The calibration of the instrument using a manometer showed a precision of less than 500 kgf. Each sample was tested at 2.5, 5.0, 7.5, 10.0 and 15.0 (times 1000 kgf). Generally, the same sample can be used throughout a testing evaluation so long as no additional curing of the sample occurs due to exposure to the temperatures used in the testing evaluation. If such additional curing occurs as a result of exposure to a particular temperature, a fresh sample should be used for each temperature trial. For the silicone adhesives described in the examples section herein, it was found that testing results were the same or very similar between the same sample used for all subsequent different weight trials or using fresh samples each time.

For ease in handling, aluminum plates with dimensions of 1 mm thickness and 300 Mm×200 mm face surface area were used to position the prepared testing assemblies of metal sheets and adhesive tape samples within the press. Only one assembly was tested at a time by positioning the assembly in the middle of the hydraulic press, using marks on the aluminum plates. The marks make it possible to put the sheets always in the same position relative to the press, as a uniform and consistent pressure to the sheets is targeted. The aluminum plates were positioned such that they extended laterally outward about 1.5 cm along the front of the press to promote ease in handling. Force was applied for 1 minute after a target force was achieved. The assembly arrangement is shown in FIG. 7 in operation 9. Then the assembly was removed from the press and was allowed to cool and evaluated. The target force was applied manually in a continuous manner and required about 5 seconds to apply.

In presenting the results of the Adhesive Bleeding Test (ABT), several conventions are used as follows. "OK" means none or almost no adhesive bled from between the metal sheets. The sheets are allowed to show some minor flow out of less then 0.5 mm outside the perimeter of the metal sheets and extending along about a maximum of 50% of the circumference of the sheets. In order to measure and improve estimation of the minor flow out of adhesive, a ruler divided in mm and 0.5 mm should be used. In case an adhesive with very poor flow resistance is tested, the viscosity in this case during testing can become so low than the adhesive flows over the edge of the sheet and drips downward with the result that a value of less than 0.5 mm flow out outside the perimeter occurs. In such case, this result is designated as "NOK." In general, the 1.49 cm metal sheet can be taken out of the two larger 5.8 cm metal sheets without adhesive traces. If the small metal sheet can be removed with no or very little effort, an OK is reported.

"NOK" means that adhesive bled out. Typically, adhesive bleed out occurs in a continuous fashion and certainly more than 0.5 mm outside the perimeter and/or more than 50% of the circumference of the sheets. If less adhesive bleeds out, the results remains OK. Also when NOK, in general, the 1.49 cm metal sheet can not or not easily be taken out of the larger 5.8 cm metal sheet and will show some adhesive traces of adhesive which bled to the center. The behavior of the 1.49 cm metal sheet does not influence the outcome of the test. The reason for this is that studying the outside adhesive flow between the 5.8 mm sheets, gives better reproducibility of ABT than the study of the ease of removal of the inner sheet of 1.49 mm. The reason for this is believed to be that one cannot always exactly position the 18 mm die cut tape exactly on the 5.8 mm sheet. However, one can more precisely remove excess tape at the outside perimeter of the rings. It is contemplated that positioning of the die cut tape can be improved by means of a cylindrical device or positioning jig in the future.

When a sample is still OK at 5,000 kgf and NOK at 7,500 kgf, then 5,000 kgf is reported. For cases in which the lowest weight of 2,500 kgf leads to a NOK result, the designation "<2.5" is used and reported herein.

Three samples were tested for each evaluation and the median was reported. An example of this is shown with regard to data presented in Table 2 in which two commercially available adhesives were subjected to ABT evaluation. These results are discussed in Examples 1 and 2 herein.

TABLE 2

Adhesive Bleeding Test (ABT) Values for Commercially Available Adhesives

| Sample | 1 | 2 | 3 | Median |
|---|---|---|---|---|
| FT 2103 | 2.5 | 2.5 | <2.5 | 2.5 |
| FT 3121 | <2.5 | 2.5 | <2.5 | <2.5 |

As described in greater detail herein, especially with the Dow Corning 7657 adhesive formulations, it was found that only a slight amount of bleeding along the outer perimeter of the test assembly occurred even at the highest levels of pressure measured.

In the brake industry, adhesives and other components are typically tested at temperatures up to 200° C. And so, for many of the tests described herein, testing temperatures were selected at 175, 200, 225 and 250° C.

Test Method: Quick-Stick

Figure 6:
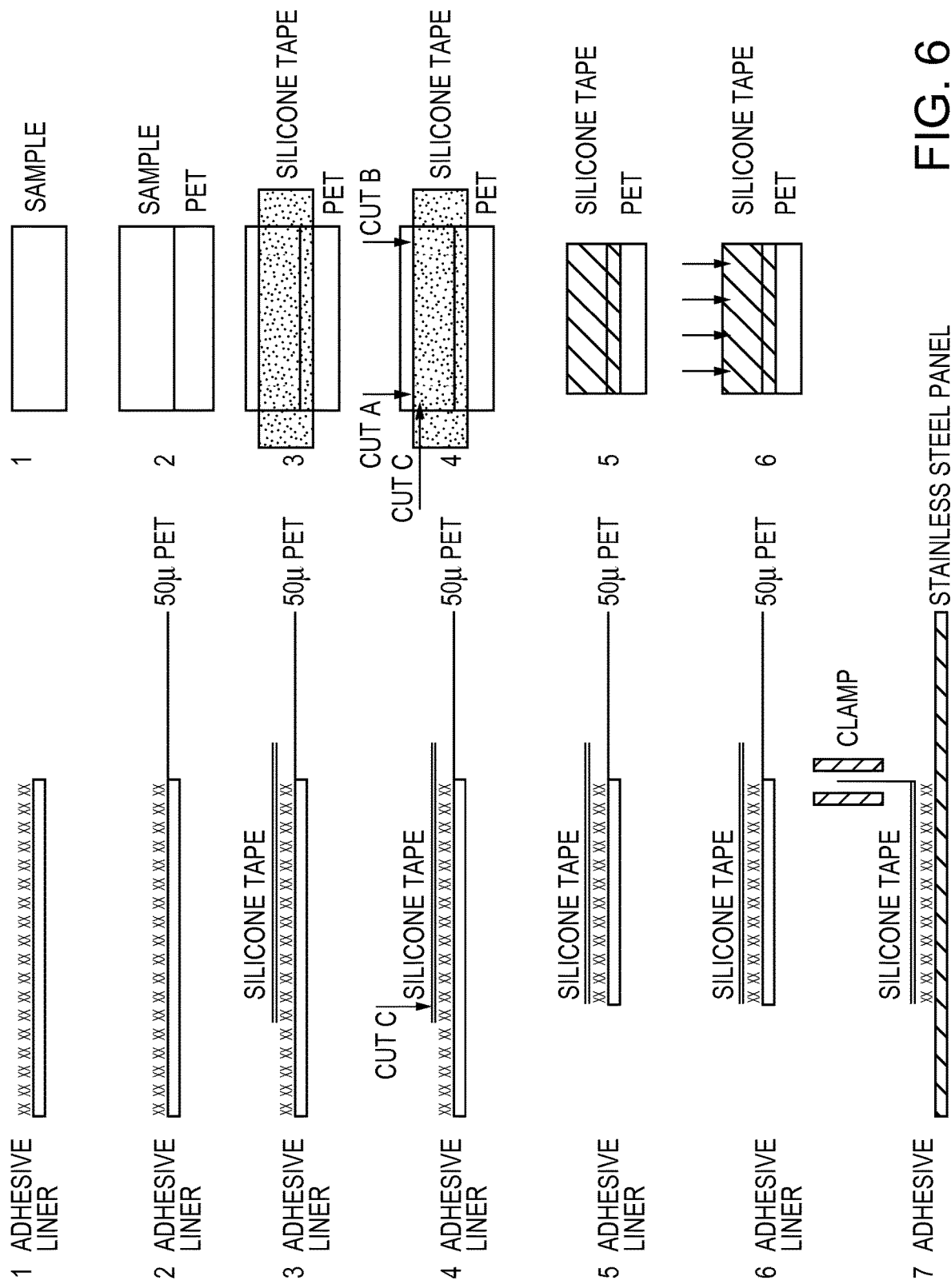
FIG. 6 illustrates preparation of samples and testing for two property measurements described herein, Quick-Stick testing and Peel Adhesion to Stainless Steel.

FIG. 6 schematically illustrates test sample preparation and set up for the Quick-Stick test. A piece of 6 cm (in machine direction)×12 cm adhesive transfer tape is cut. In case only one liner was present, a second liner is laminated to the exposed adhesive face for cutting purposes.

The second liner (or most easy to remove liner in case of a double linered transfer tape) is removed and the remaining transfer tape is laid down with the exposed adhesive face directed upwards. This is depicted as operation 1 in FIG. 6.

Then, a 50 micron liner PET 50 F is cut to 3 cm×12 cm and placed alongside the 12 cm side of the cut transfer tape. It is desirable to reduce the distance between the two sheets as much as possible. No gap between the sample and the PET 50 F is allowed because this can result in a high starting peak. If such peak would show, it should be removed from the data (see below). This is depicted as operation 2 in FIG. 6.

A 4.8 cm wide and at least 15 cm long yellow silicone pressure sensitive adhesive tape (Stockvis Tapes type 134720 silicone adhesive selfwound tape) is placed onto the exposed adhesive face of the sample to form a reinforcement for the transfer tape adhesive layer. This silicone tape is used as reinforcement because many samples are hotbond in nature and show little to no adhesion to a normal reinforcement substrate such as polyester film. This is depicted as operation 3 in FIG. 6.

This tape should overlap approximately 4.1 cm (not critical) with the transfer tape and approximately 0.7 cm overlap with the PET 50 F liner.

It is important that the lamination of the yellow tape is performed without any air entrapments.

Next, the excess material is cut or removed along the four sides. This is depicted as operation 4 in FIG. 6. The excess yellow tape is removed at both sides, (see cut A and B in FIG. 6). This is typically the portion that extends beyond the 12 cm zone, in practice a bit more is cut off at both sides so that about 11.5 cm width remains. A few mm of the yellow tape is also removed at the transfer tape side, (see cut C in FIG. 6).

The samples are then laminated in a laboratory laminator, using two rubber rolls of 5 cm diameter each, under a weight of 10 pounds. The laminator can be a type MW-1 available from Atlas Electric Devices Co, USA. The samples are shown in operation 5 in FIG. 6.

The samples are then cut to three individual test specimens of 2.54 mm wide. Each sample is approximately 6.5 cm long comprising approximately 3.5 cm of transfer tape and 3 cm of PET 50 F liner.

The original liner of the sample is removed and the sample is laminated to a stainless steel panel (type 304 BA, 1.5 mm thickness) with a one pound roller at 1500 mm/min speed once at room temperature. The samples are shown in operation 6 in FIG. 6.

Then, the yellow tape is removed by pulling its finger lift (PET 50 F end) from the stainless steel plate in an Instron tensile machine at an angle of 90° and at a peeling speed of 300 mm/min. The time between lamination with the one pound roller and the start of the measurement is 15 seconds. This configuration is depicted in operation 7 of FIG. 6.

The first 1 mm and last 2 mm of delamination which is measured should not be taken into account. Potentially, a start peak may develop which should not be part of the measurement result.

The average of the two (2) samples is reported.

Test Method: Peel Adhesion to Stainless Steel (PASS) at 100° C.

The preparation of individual test specimens for this test is the same as for the test specimens for the Quick-Stick test method. Also, the set up for the peel adhesion test is the same as for the Quick-Stick test. FIG. 6 schematically illustrates test sample preparation and set up for the peel adhesion test.

Once having obtained the individual test specimens of 2.54 mm wide and approximately 6.5 cm long, the original liner is removed from a sample and the sample is laminated to a stainless steel panel (type 304BA) with a 4.5 pound roller at 1500 mm/min speed twice at room temperature. This operation is depicted as operation 6 in FIG. 6.

The panels are then placed horizontal into a preheated oven at 100° C.

After 4 minutes of heating, another application of pressure is applied with the 4.5 pound roller. The panels remain in the oven during the handling.

Then, the panels are immediately removed from the oven and allowed to cool at room temperature for 10 minutes.

The yellow tape is removed with its finger lift (PET 50 F end) from the stainless steel plate in an Instron tensile machine at an angle of 90° and at a peeling speed of 300 mm/min. This operation is depicted as operation 7 in FIG. 6.

The first 2 mm and last 1 mm of delamination which is measured should not be taken into account. Potentially, a start peak may develop which should not be part of the measurement result.

The average of two (2) measurements is reported.

Test Method: Composite Loss Factor (CLF)

Figure 5:
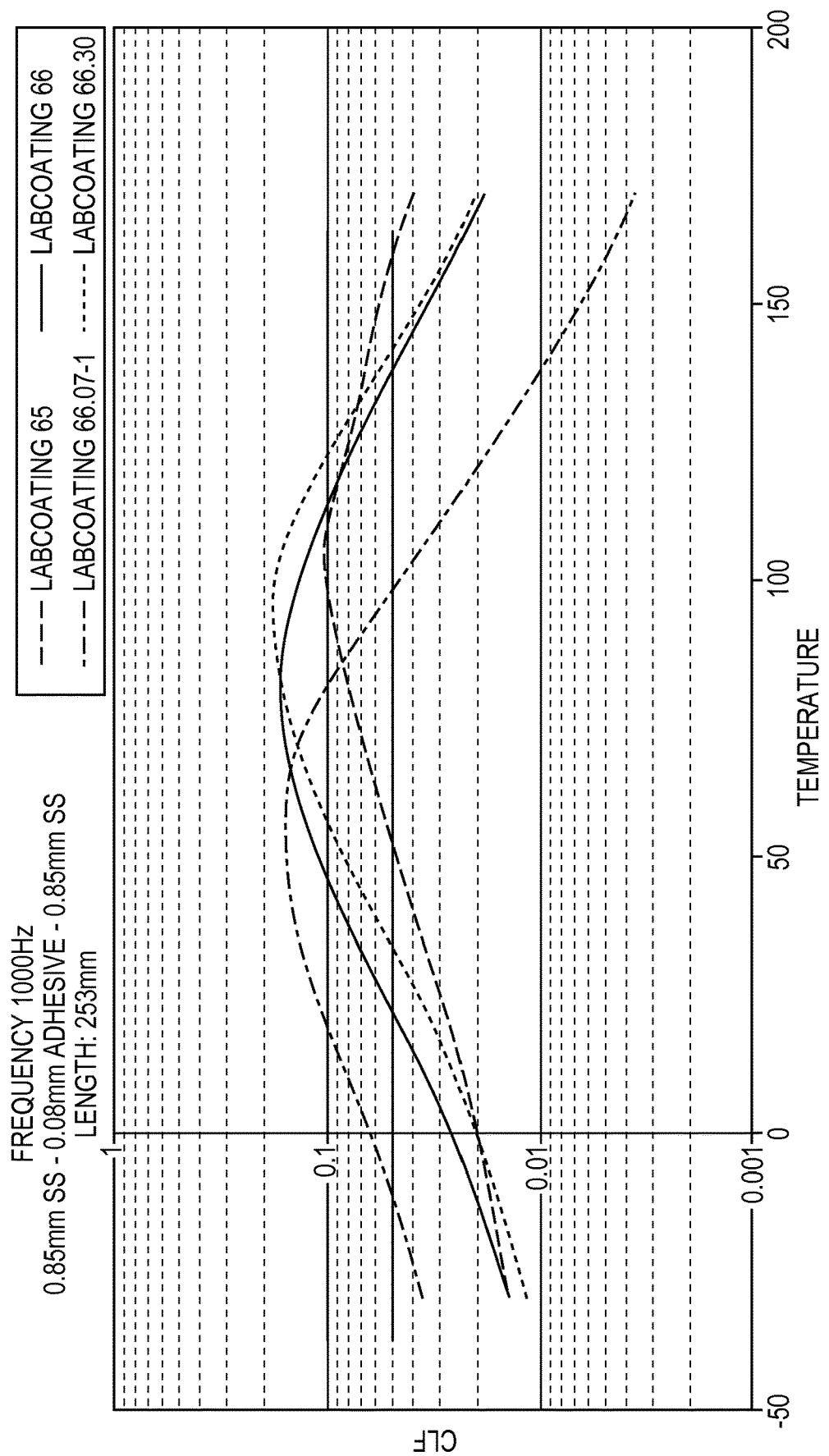
FIG. 5 is a graph illustrating composite loss factor (CLF) as a function of temperature for several adhesives.

The composite loss factor data presented in FIG. 5 were obtained using ASTM E756-98. Generally, in this evaluation, a sample of adhesive was laminated between two similar steel beams having dimensions of 1.17 mm in thickness and 254 mm in free length. In practice the adhesive sample was positioned in a cantilevered test assembly in an environmental chamber (temperature was varied from −30° C. to at least 170° C.), and vibrationally excited with a frequency from 20 to 3,000 Hz. From this data the MLF (Material Loss Factor) data was retrieved by implementing the Base Beam-data (Steel beams). The MLF is used to make a design of the CLF (Composite Loss Factor) by a certain frequency for a certain construction. In this case a frequency of 1000 Hz was used and a construction of 0.85 mm SS/0.08 mm adhesive/0.85 mm SS with a free length of 253 mm, (SS=stainless steel). This is represented in FIG. 5 for several adhesive samples.

Example 1

FT 3121, FT 2103, and FT 3102 were subjected to Adhesive Bleeding Test (ABT) evaluations. These are commercial products from Avery Dennison. These adhesives are used in the shim industry and are representative of currently available acrylate and silicone adhesives. The ABT values reported in Table 3 were based upon samples having adhesive coat weights of 84 g/m$^2$.

TABLE 3

ABT Values for Commercially Available Silicone Pressure Sensitive Adhesives

| Product | Adhesive Composition | Adhesive Coat weight [g/m$^2$] | ABT 175° C. [1000 kg] | ABT 200° C. [1000 kg] | ABT 225° C. [1000 kg] |
|---|---|---|---|---|---|
| FT 3121 | Acrylic PSA | 75 | 2.5 | <2.5 | <2.5 |
| FT 2103 | Peroxide silicone PSA | 84 | 2.5 | 2.5 | <2.5 |
| FT 3102 | Peroxide silicone PSA | 48 | | 2.5 | |

From Table 3, it appears that the ABT values of the silicone based transfer tape FT 2103 demonstrate a better resistance to flow under pressure at a temperature of 200° C. than the acrylic based transfer tape FT 3121. At 225° C. the difference likely still exists, although the ABT 225° C. values are not significantly different.

A thinner adhesive layer of 48 g/m$^2$ of transfer tape FT 3102 (which has the same adhesive as FT 2103) should be less prone to flow as often found in practice, but as can be derived from Table 3, the difference is not significant with the ABT 200° C. test.

The commercial tapes FT 2103 and FT 3102 are based on a peroxide curing silicone PSA. As previously noted, a strategy for potentially improving the ABT performance, is to add more silicone resin. This strategy was tried for PSA 610 available from Momentive. 100 wet parts of this adhesive was modified with 25 and 50 wet parts of silicone resin SR-545 which is available from Momentive.

PSA 610 was mixed with different amounts of Dow Corning Resin SR-545 and also the crosslinker Peroxan from Pergan as shown in Table 4 in one phase using a motor driven propeller for 10 minutes at a temperature of 23° C. to form a clear homogeneous solution.

TABLE 4

Formulations of Peroxide Curing Components

| | | Formulation | | |
|---|---|---|---|---|
| Component | Supplier | 1 | 2 | 3 |
| PSA 610 | Momentive | 100 | 100 | 100 |
| SR-545 | Dow Corning | 25 | 50 | 25 |
| Peroxan | Pergan | 2 | 2 | 4 |

The formulations were coated onto the release coating of a 50 micron polyester liner called PET 50 F (see its preparation below) using a knife laboratory coater to a dry coat weight of 84+/−4 g/m$^2$. Drying conditions were first, 10 minutes at 100° C. to enable most of the solvents to evaporate, followed by 5 minutes in a 180° C. oven to cure the adhesives and also to destroy remainders of the peroxide crosslinker. A second liner PET 50 F was used to cover the open adhesive faces after the drying. These transfer tapes were used to measure physical properties such as ABT, Quick-Stick, peel adhesion on stainless steel (PASS) at 100° C. and release after 1 day of dwell time. This second liner was removed first prior to performing these tests.

Thus, the release measurements which were performed refer to a wet, direct coating on the release system. All release measurements show an easy release not higher than 20 gf/25 mm measured at 10 m/min peel speed at an angle of 90°.

The fluorosilicone release liner PET 50 F was prepared as follows. A 50 micron Hostaphan 3SAC white polyester substrate from Mitsubishi was used, which has a special coating to enhance anchorage of release silicones. A blend of Syl-Off Q2-7785 fluorosilicone release coating, Syl-Off Q2-7560 crosslinker and heptanes solvent was prepared in respective parts by weight: 100/3.2/60. This solution with about 50% solids was coated onto the Hostaphan 3SAC polyester substrate and dried in a oven at 150° C. with a residence time of 40 seconds at a final dry coat weight of 1.1+/−0.2 g/m$^2$. The liner was allowed to post cure for at least a week prior to further use.

In both cases a PET 50 F was used as a second liner to cover the other side, after the drying. In Table 5, it is evident that the ABT values can be improved slightly with 25 parts of the resin, but higher additions appear to result in a decline in the ABT values. Overall the addition of resin is not a significant improvement over the standard commercially available adhesive tapes of Table 3.

TABLE 5

ABT Values for Peroxide Curing Silicone Pressure Sensitive Adhesives 100 parts of silicone PSA is used

| Test | Pph of resin SR-545 added | | ABT [1000 kg] | |
|---|---|---|---|---|
| Temperature (° C.) | Silicone PSA | Peroxan pph | 25 Pph of resin 2-7466 added | 50 Pph of resin 2-7466 added |
| 175 | PSA 610 | 2 | 2.5 | |
| 200 | PSA 610 | 2 | 2.5 | <2.5 |
| 175 | PSA 610 | 4 | 5 | |
| 200 | PSA 610 | 4 | 2.5 | |

Example 2

In another evaluation, an attempt was made to improve ABT values by increasing the peroxide level. As more peroxide is used, chemical bonds increase between the silicone polymers and resins. The resulting higher crosslinking level of the adhesive should promote resistance to flow. The level of peroxide recommended for 100 dry parts of the adhesive PSA 610 is 2%. As shown in Table 4, peroxide was added at levels of 2% and 4% to wet pressure sensitive adhesive PSA 610. Use of 4% peroxide resulted in an improvement for the ABT 175° C. but not a significant increase for the ABT 200° C. (PSA 610 has about 60% solids).

Examples 3 and 4

In still another evaluation, several adhesive formulations were prepared using commercially available, addition curing, silicone pressure sensitive adhesives with varying amounts of resin. The various samples, utilizing adhesive coat weights of 84 g/m$^2$, were subjected to ABT evaluations, Quick-Stick, peel adhesion on stainless steel (PASS) at 100° C., and CLF analysis. The results of the various testing for the samples are set forth below in Table 6. The commercially available silicone resins used were 7657, 2013, and 7651N.

In Table 6, the following designations were used. For Quick-Stick failure modes: CR=clean removal; pSg=partially staining; Top CF=top cohesion failure; and LSg=Light Staining. For peel adhesion on stainless steel (PASS) at 100° C., the designations were as follows: CR=clean removal; Sh/CF=shocking/Cohesion Failure; Top CF=top cohesion failure; AT/YTF=Adhesive Transfer and Yellow Tape Failure. As previously explained, Quick-Stick is a measure indicating tackiness of an adhesive at room temperature.

In another evaluation, three (3) commercially available silicone pressure sensitive adhesives from Dow Corning were tested. DC 7657 is a general silicone pressure sensitive adhesive, and said to exhibit stable release against fluorosilicone based release liners (see Table 7A). DC 2013 is a solventless silicone pressure sensitive adhesive, and said to exhibit stable release against fluorosilicone based release liners (see Table 7B). DC 7651N is a removable silicone pressure sensitive adhesive (see Table 7C).

TABLE 6

Quick-Stick, 100° C. PASS, ABT, and CLF Values for Addition Curing Silicone Pressure Sensitive Adhesives at 84 g/m$^2$ coat weight

| Unit | Silicone PSA | pph of resin 2-7466 added | | | | | | | | | | |
|---|---|---|---|---|---|---|---|---|---|---|---|---|
| | | 0 | 7 | 15 | 21.5 | 28 | 30 | 40 | 50 | 60 | 75 | 90 |
| | 7657 | 67 | 66.07 | 66.15 | 66 | | 66.30 | 99.40 | 66.50 | 66.3 | | 66.90 |
| ° C. | Max. CLF Temperature | | 54 | | 79 | | 95 | | | | | |
| | Max. CLF Value | | 0.153 | | 0.158 | | 0.180 | | | | | |
| ° C. | Tg | | 44 | | 79 | | 79 | | 97 | | | 119 |
| N/25 mm | QUICK-STICK | 13.5 CR | 11.3 CR | 12.2 CR | 11.3 pSg | | 3.9 top CF | 0.16 CR | 0.12 LSg | 0.02 CR | | <0.01 CR |
| N/25 mm | PEEL ADHESION SS 100° C. | 17.5 CR | 12.7 CR | 13.3 CR | 14.6 CR | | 13.2 Sh/ TopCF | 15.5 Sh/CF | 14.7 Sh/CF | 11.8 CF | | 1.3 CF |
| | 175° C. ABT | | | | | | 15 | | | | | |
| 1000 kgf | 200° C. ABT | 5 | 7.5 | 7.5 | 7.5 | | 10 | 10 | 10 | 10 | | 7.5 |
| | 225° C. ABT | | 7.5 | 7.5 | 7.5 | | 7.5 | | 5 | | | |
| | 250° C. ABT | | | | | | 5 | | | | | |
| | 2013 | | 65A | | 65b | | 65 | | 65d | | 65.2 | 65.3 |
| ° C. | Max. CLF Temperature | | | | | | | 105 | | | | |
| | Max. CLF Value | | | | | | | 0.102 | | | | |
| N/25 mm | QUICK-STICK | | 12.8 CR | | 11.4 CR | | 4.2 CR | 3.0 top CF | | | 0.41 Top CF | 0.36 Top CF |
| N/25 mm | PEEL ADHESION SS 100° C. | | 12.5 CR | | 19.1 CR | | 23.5 AT/YTF | 29.1 AT/YTF | | | 26.3 AT/YTF | 15.9 AT/YTF |
| 1000 kgf | 200° C. ABT | | 5 | | | | 5 | 7.5 | 15 | | 10 | 15 |
| | 7651N | 67.0 | | | 67.1 | | 67.2 | | | | | |
| N/25 mm | QUICK-STICK | 0.12 CR | | | 2.1 CR | | 0.27 CR | | | | | |
| N/25 mm | PEEL ADHESION SS 100° C. | 0.1 CR | | | 1.35 CR | | 3.6 Sg | | | | | |
| 1000 kgf | 200° C. ABT | 5 | | | 7.5 | | 15 | | | | | |

TABLE 7A

Formulations of Addition Curing Formulations with DC 7657

| | | Formulations | | | | | | | |
|---|---|---|---|---|---|---|---|---|---|
| | | 67 | 66.07 | 66.15 | 66 | 66.30 | 66.40 | 66.50 | 66.3 | 66.90 |
| Component | Supplier | 4 | 5 | 6 | 7 | 8 | 9 | 10 | 11 | 12 |
| DC 7657* | Dow Corning | 100 | 100 | 100 | 100 | 100 | 100 | 100 | 100 | 100 |
| DC 2-7466 | Dow Corning | 0 | 7 | 15 | 21.5 | 30 | 40 | 50 | 60 | 90 |
| Syl-Off 7682-000 | Dow Corning | 0 | 0 | 0.2 | 0 | 0 | 0 | 0 | 0 | 0 |
| Katalysator OL | Wacker Chemical | 0.4 | 0.4 | 0.4 | 0.4 | 0.4 | 0.4 | 0.4 | 0.4 | 0.4 |

*DC 7657 contains similar components as Syl-Off 7682-000.

TABLE 7B

Formulations of Addition Curing Formulations with DC 2013

| | | Formulations | | | | | |
|---|---|---|---|---|---|---|---|
| | | 65A | 65b | 65 | 65d | 65.2 | 65.3 |
| Component | Supplier | 13 | 14 | 15 | 16 | 17 | 18 |
| DC 2013* | Dow Corning | 100 | 100 | 100 | 100 | 100 | 100 |
| DC 2-7466 | Dow Corning | 7 | 28 | 40 | 50 | 75 | 90 |
| Syl-Off 7682-000 | Dow Corning | 0.5 | 0.5 | 0.2 | 0 | 0.2 | 0.2 |
| Katalysator OL | Wacker Chemical | 0.5 | 0.5 | 0.4 | 0.5 | 0.5 | 0.5 |

*DC 2013 contains similar component as Syl-Off 7682-000.

TABLE 7C

Formulations of Addition Curing Formulations with DC 7651N

| | | Formulations | | |
|---|---|---|---|---|
| Component | Supplier | 67.0 19 | 67.1 20 | 67.2 |
| DC 7651N | Dow Corning | 100 | 100 | 100 |
| DC 2-7466 | Dow Corning | 0 | 21.5 | 40 |
| Syl-Off 7682-000 | Dow Corning | 0.4 | 0.4 | 0.4 |
| Katalysator OL | Wacker Chemical | 0.4 | 0.4 | 0.4 |

The different silicone adhesives were mixed with different amounts of Dow Corning Resin 2-7466 and also the crosslinker Syl-Off 7682-000 from Dow Corning as shown in Tables 7A-7C in one phase using a motor driven propeller for 10 minutes at a temperature of 23° C. to form a clear homogeneous solution. In some cases, no additional crosslinker was added, since in some commercial silicone adhesives there is already crosslinker incorporated. Extra additions can still be performed to increase the crosslink density.

In a second phase the Katalystor OL from Wacker was added and again mixed for 10 minutes.

The formulations were coated onto the release coating of a 50 micron polyester liner called PET 50 F (see its preparation as previously noted) using a knife laboratory coater to a dry coat weight of 84+/−4 g/m².

Drying conditions were first, 10 minutes at 100° C. to enable most of the solvents to evaporate, followed by 5 minutes in a 150° C. oven to cure the adhesives. A second liner PET 50 F was used to cover the open adhesive sides after the drying. These transfer tapes were used to measure physical properties such as ABT, Quick-Stick, Peel Adhesion 100° C. and release after 1 day of dwelltime. This second liner was removed first prior to do these tests.

7657 was modified with different resin levels of Dow Corning 2-7466 from 7 to 90 parts compared to 100 parts of wet adhesive. Even the unmodified 7657 formulation already exhibits an ABT 200° C. of 5,000 kgf. The ABT 200° C. increases with higher levels of resin to a value of 10,000 kgf. A decline is noticed for the highest level of 90 parts of resin to 7,500 kgf. The higher levels of resin also have an effect on the tackiness at room temperature which was measured using the Quick-Stick method onto stainless steel. Sample 21.5% exhibits a strongly reduced finger tack, although its Quick-Stick value is still quite high at 11.3 N/25 mm. Sample 30% which has no finger tack has a Quick-Stick value below 5N/25 mm of 3.9 N/25 mm. From this sample on (and maybe also at slightly lower resin level) the ABT 200° C. is at its maximum.

Thus, a negative correlation is observed between ABT 200° C. and Quick-Stick values up to a certain point. To be useful as an adhesive for electronic parking brakes, the adhesive must exhibit sufficient adhesion. When applied at a higher temperature, a peel adhesion test onto stainless steel (PASS) at 100° C. test was used. That test simulates the process in which the transfer tape is laminated to a substrate at elevated temperature. For tapes in which the adhesive will not exhibit at least 5 N/25 mm of Quick-Stick at room temperature, but exhibit a peel adhesion 100° C. of more than 5N/25 mm, such tapes are considered to be hotbond pressure sensitive adhesive tapes. These are the preferred adhesives to be used for electronic parking brake application since they exhibit the highest resistance to flow as measured by the ABT 200° C. test. The sample with the highest level of resin of 90% does not exhibit a peel adhesion higher than 5N/25 mm. This is believed to indicate that the adhesive must become hard, even at elevated temperatures of 100° C., or else the adhesive does not bond or the bond is too brittle in the debonding phase of the peel adhesion test, and therefore is not suited as a candidate to bond electronic parking brake components. In this respect, the low resin modified samples (in case of 7657 with 0 to about 21.5% of 7657 resin) are still better candidates. This is because such samples exhibit significantly higher ABT 200° C. values than any of the comparable samples. For other types of addition curing silicone pressure sensitive adhesives the same principles apply. Another example is the 2013 silicone pressure sensitive adhesive. In this case a level of approximately 50% 2-7466 resin is necessary to achieve hotbond adhesive characteristics with the most useful values of ABT 200° C. In the case of 2013, the peel adhesion values 100° C. are higher than for 7657 and from sample 40% on, the silicone tape used in this test starts to fail, which is only positive. This means that the adhesion of the tested silicone adhesive is greater than the adhesion of the specified silicone tape used in this test. Another adhesive tested is the 7651N, which is a removable addition curing pressure sensitive adhesive. Once again favorable values of ABT 200° C. are found above 5,000 kgf and one sample exhibited a 15,000 kgf value. The Quick-Stick values are also below 5N/25 mm. But this adhesive is not of the hotbond type as the peel adhesion 100° C. is also low. Although the ABT value is relatively high in particular at higher resin levels this adhesive is not suited as an electronic parking brake adhesive.

The composite loss factor data presented in FIG. 5 was obtained using ASTM E756-98. Generally, in this evaluation, a sample of adhesive was laminated between two similar steel beams having dimensions of 1.17 mm in thickness and 254 mm in free length. The adhesive sample was positioned in a cantilevered test assembly in an environmental chamber, and vibrationally excited with a frequency from 20 to 3,000 Hz. The testing utilized a particular construction of an adhesive layer disposed between two stainless steel members. This construction is described in the previously noted test methods. FIG. 5 was created with measurement points around 1000 Hz. Referring to FIG. 5, the four (4) curves correspond to measurements obtained from several previously noted formulations 65, 66.07, 66, and 66.30 (see Tables 6, 7A, and 7B).

Referring back to the 7657 samples, another effect of the silicone resin addition which is observed, is that the sound deadening properties start to change. Although the amount of sound dampening is about the same, about 0.15 units of composite loss factor (CLF), the temperature at which the sound dampening occurs, increases with higher levels of resin included in the formulation (from 54° C. to 95° C. for the samples). The 40 parts resin sample from the 2013 adhesive exhibits a lower value of CLF of 0.102 but still higher as 0.1 which is the point at which good dampening is achieved. Actually a CLF value below 0.05 is considered to be a point at which poor dampening occurs. The sound deadening properties which are exhibited by the addition curing silicone pressure sensitive adhesives, including those with high levels of resin, are the main reason why they are so useful to bond brake components especially in the field of electronic parking brakes with the much higher levels of pressure and temperatures involved. At present, most commercially available phenolic based thermosets are used, which exhibit no dampening.

In addition, some ABT values at different temperatures are shown for the 7657 samples: 175° C., 225° C. and 250° C. Previously, it was demonstrated for PSA 610 that at least one formulation achieved ABT values higher than 2,500 kgf, i.e; 5,000 kgf. However, that value was only at 175° C. test temperature. Many of the addition curing silicone pressure sensitive adhesives evaluated and described herein exhibit ABT 200° C. values above 5,000 kgf. This is why the 200° C. temperature is used most often in comparing the flow properties of the different candidates. The ABT values measured at 225° C. and 250° C., for resin modified addition curing silicone pressure sensitive adhesives, most preferable the hotbond ones, also exhibit values above 5,000 kgf.

Although the ABT values reported and claimed herein are based upon specified adhesive coat weights of 84 g/m², an investigation was conducted as to ABT values and other testing values for samples prepared using thinner adhesive coat weights, for example 36 g/m².

TABLE 8

Quick-Stick, 100° C. PASS and ABT Values for Addition Curing Silicone Pressure Sensitive Adhesives at 36 g/m² coat weight

| Formulation | 99.41 |
|---|---|
| ABT 200° C. | 15 |

TABLE 8-continued

Quick-Stick, 100° C. PASS and ABT Values for Addition Curing Silicone Pressure Sensitive Adhesives at 36 g/m² coat weight

| Quick-Stick | 0.13 CR |
|---|---|
| PASS 100° C. | 19.4 CF |

Many other benefits will no doubt become apparent from future application and development of this technology.

All patents, published applications, and articles noted herein are hereby incorporated by reference in their entirety.

It will be understood that any one or more feature or component of one embodiment described herein can be combined with one or more other features or components of another embodiment. Thus, the present subject matter includes any and all combinations of components or features of the embodiments described herein.

As described hereinabove, the present subject matter solves many problems associated with previously known adhesives, tapes, and practices. However, it will be appreciated that various changes in the details, materials and arrangements of components and operations, which have been herein described and illustrated in order to explain the nature of the subject matter, may be made by those skilled in the art without departing from the principle and scope of the subject matter, as expressed in the appended claims.

What is claimed is:

1. A hot bond silicone adhesive consisting of, prior to curing:
   (i) 100 parts by weight of a polydimethylsiloxane gum and resin with vinyl and hydride functionality;
   (ii) 1-60 parts by weight of a silicone resin containing tetra(trimethysiloxy) silane;
   (ii) 0-1.5 parts by weight of a silicone hydride crosslinker;
   (iii) 0.1-1.6 parts by weight of a platinum based catalyst; and
   (iv) an optional inhibitor;
   wherein after curing, the hot bond silicone adhesive exhibits:
   (i) a Quick-Stick value less than 5 N/25 mm,
   (ii) a Peel Adhesion to Stainless Steel (PASS) value at 100° C. greater than 5 N/25 mm, and
   (iii) an Adhesive Bleeding Test (ABT) value greater than or equal to 7,500 kgf at 200° C.; and
   (iv) substantially no tack in dry form using finger pressure at room temperature.

2. The hot bond silicone adhesive of claim 1 wherein the hot bond silicone adhesive is free of fillers.

3. The hot bond silicone adhesive of claim 1 wherein the hot bond silicone adhesive exhibits an Adhesive Bleeding Test (ABT) value greater than or equal to 10,000 kgf at 200° C.

4. The hot bond silicone adhesive of claim 3 wherein the hot bond silicone adhesive exhibits an Adhesive Bleeding Test (ABT) value greater than or equal to 15,000 kgf at 200° C.

5. A hot bond silicone adhesive of claim 1,
   wherein the hot bond silicone adhesive is addition curable; and
   wherein after curing, the hot bond silicone adhesive of exhibits substantially no tack in dry form using finger pressure at room temperature.

6. The hot bond silicone adhesive of claim 5 wherein the hot bond silicone adhesive exhibits an Adhesive Bleeding Test (ABT) value greater than or equal to 10,000 kgf at 200° C.

7. The hot bond silicone adhesive of claim 6 wherein the hot bond silicone adhesive exhibits an Adhesive Bleeding Test (ABT) value greater than or equal to 15,000 kgf at 200° C.

8. The hot bond silicone adhesive of claim 5 wherein the hot bond silicone adhesive is free of fillers.

9. A transfer tape for bonding a first member to a second member, the transfer tape comprising: (i) at least one liner; and (ii) a layer of a hot bond silicone adhesive of claim 1.

10. The transfer tape of claim 9 wherein the hot bond silicone adhesive is free of fillers.

11. The transfer tape of claim 9 further comprising a layer of hot bond silicone adhesive of claim 1.

12. A method of producing a transfer tape for bonding one member to another member, the method comprising:
   applying a hot bond silicone adhesive of claim 1 to a liner or substrate layer; and at least partially curing the hot bond silicone adhesive to form the transfer tape.

13. The method of claim 12 wherein at least partially curing the hot bond silicone adhesive is performed by heating the silicone formulation to a temperature of at least 60° C.

14. The method of claim 12 wherein at least partially curing the hot bond silicone adhesive is performed by heating the silicone formulation to a temperature of at least 100° C.

15. The method of claim 12 wherein at least partially curing the hot bond silicone adhesive is performed by heating the silicone formulation to a temperature of at least 150° C.

16. The method of claim 12 wherein the hot bond silicone adhesive is fully cured to form the transfer tape.

17. A method of bonding a first member to a second member, the method comprising:
   laminating a layer of the hot bond silicone adhesive of claim 1 to a first member such that at least a portion of a face of the layer of the hot bond silicone adhesive is exposed; and bonding the second member to the exposed portion of the hot bond silicone adhesive.

18. The method of claim 17 wherein laminating the layer of the hot bond silicone adhesive to the first member is performed at room temperature.

19. The method of claim 17 wherein laminating the layer of the hot bond silicone adhesive to the first member is performed by heating the adhesive to a temperature of at least 60° C.

20. The method of claim 17 wherein laminating the layer of the hot bond silicone adhesive to the first member is performed by heating the adhesive to a temperature of at least 100° C.

21. The method of claim 17 wherein laminating the layer of the hot bond silicone adhesive to the first member is performed by heating the adhesive to a temperature of at least 125° C.

22. The method of claim 17 wherein laminating the layer of the hot bond silicone adhesive to the first member is performed by heating the adhesive to a temperature of at least 150° C.

23. The method of claim 17 wherein bonding of the second member to the layer of the hot bond silicone adhesive is performed at room temperature.

24. The method of claim 17 wherein bonding the second member to the layer of the hot bond silicone adhesive is performed by heating the adhesive to a temperature of at least 100° C.

25. The method of claim 17 wherein bonding the second member to the layer of the hot bond silicone adhesive is performed by heating the adhesive to a temperature of at least 125° C.

26. The method of claim 17 wherein bonding the second member to the layer of the hot bond silicone adhesive is performed by heating the adhesive to a temperature of at least 150° C.

27. A hot bond silicone adhesive consisting essentially of, prior to curing:
   (i) 100 parts by weight of a polydimethylsiloxane gum and resin with vinyl and hydride functionality;
   (ii) 1-60 parts by weight of a silicone resin containing tetra(trimethysiloxy) silane;
   (ii) 0-1.5 parts by weight of a silicone hydride crosslinker;
   (iii) 0.1-1.6 parts by weight of a platinum based catalyst; and
   (iv) an optional inhibitor;
   wherein, after curing, the cured hot bond silicone adhesive exhibits a Quick-Stick value less than 5 N/25 mm, a Peel Adhesion to Stainless Steel (PASS) value at 100° C. greater than 5 N/25 mm, an Adhesive Bleeding Test (ABT) value greater than or equal to 7,500 kgf at 200° C., and substantially no tack in dry form using finger pressure at room temperature.

28. The hot bond silicone adhesive of claim 1 wherein the hot bond silicone adhesive is an addition curing adhesive.

* * * * *